(12) United States Patent
Huntington et al.

(10) Patent No.: US 10,570,825 B2
(45) Date of Patent: Feb. 25, 2020

(54) SYSTEMS AND METHODS FOR CONTROLLING COMBUSTION OF A FUEL

(75) Inventors: Richard Huntington, Houston, TX (US); Chad C. Rasmussen, Kuala Lumpur (MY); Franklin F. Mittricker, Jamul, CA (US); Tim Lieuwen, Atlanta, GA (US); Sulabh K. Dhanuka, Houston, TX (US); Himanshu Gupta, Lorton, VA (US); Moses K. Minta, Missouri City, TX (US); Loren K. Starcher, Sugar Land, TX (US)

(73) Assignees: ExxonMobil Upstream Research Company, Houston, TX (US); Georgia Tech Research Corporation, Atlanta, GA (US)

(*) Notice: Subject to any disclaimer, the term of this patent is extended or adjusted under 35 U.S.C. 154(b) by 996 days.

(21) Appl. No.: 13/808,073

(22) PCT Filed: Jul. 1, 2011

(86) PCT No.: PCT/US2011/042870
§ 371 (c)(1),
(2), (4) Date: May 23, 2014

(87) PCT Pub. No.: WO2012/003489
PCT Pub. Date: Jan. 5, 2012

(65) Prior Publication Data
US 2014/0250908 A1    Sep. 11, 2014

Related U.S. Application Data

(60) Provisional application No. 61/361,169, filed on Jul. 2, 2010.

(51) Int. Cl.
*F02C 7/22*    (2006.01)
*F02C 1/08*    (2006.01)
(Continued)

(52) U.S. Cl.
CPC ............ *F02C 7/22* (2013.01); *F02C 1/08* (2013.01); *F02C 3/20* (2013.01); *F02C 3/34* (2013.01);
(Continued)

(58) Field of Classification Search
CPC ...... F02C 3/34; F02C 9/16; F02C 3/20; F02C 3/30; F02C 9/00; F02C 9/28; F02C 7/22;
(Continued)

(56) References Cited

U.S. PATENT DOCUMENTS 3,705,492 A    12/1972   Vickers .................. 60/39.51
3,841,382 A    10/1974   Gravis, III et al. ......... 159/16 R
(Continued)

FOREIGN PATENT DOCUMENTS

AU    2009228283    10/2009
CA    2231749    3/1998 ............ F23C 9/00
(Continued)

OTHER PUBLICATIONS

Ricahrd C. Flagan, John H. Seinfeld; "Fundamentals of Air Pollution Engineering"; 1988; p. 59-64.*
(Continued)

*Primary Examiner* — Gerald L Sung
*Assistant Examiner* — Alain Chau
(74) *Attorney, Agent, or Firm* — Edmonds & Cmaidalka, P.C.

(57) ABSTRACT

A fuel, an oxidant, and a diluent can be introduced to a combustion zone, wherein the oxidant comprises air, oxygen-enriched air, or oxygen-lean air. At least a portion of the fuel can be combusted to produce an exhaust gas comprising, nitrogen, nitrogen oxides, and carbon monoxide. The exhaust gas can be expanded to produce mechanical power and an expanded exhaust gas. A concentration of at least one of oxygen, hydrogen, nitrogen oxides and carbon monoxide,
(Continued)

in the exhaust gas or the expanded exhaust gas or both can be determined, and an amount of the oxidant or the fuel introduced to the combustion zone, or both, can be adjusted based on the determined concentration to produce an exhaust gas containing a combined amount of oxygen and carbon monoxide of less than about 2 mol % and a nitrogen concentration ranging from 20 mol % to 75 mol %. The diluent to the combustion zone can include at least a portion of the exhaust gas containing a combined amount of oxygen and carbon monoxide of less than 2 mol % and a nitrogen concentration ranging from 20 mol % to 75 mol %.

43 Claims, 10 Drawing Sheets

(51) Int. Cl.
 F02C 9/16 (2006.01)
 F02C 3/20 (2006.01)
 F23R 3/26 (2006.01)
 F02C 3/34 (2006.01)
 F02C 9/28 (2006.01)
 F23N 5/00 (2006.01)
 F01K 23/06 (2006.01)

(52) U.S. Cl.
 CPC .............. *F02C 9/16* (2013.01); *F02C 9/28* (2013.01); *F23R 3/26* (2013.01); *F01K 23/06* (2013.01); *F05D 2260/611* (2013.01); *F05D 2270/0831* (2013.01); *F23N 5/003* (2013.01); *Y02E 20/185* (2013.01)

(58) Field of Classification Search
 CPC .......... F02C 1/08; F02C 1/005; Y02E 20/185; F05D 2260/611; F05D 2270/08; F05D 2270/0831; F05D 2260/061; F23C 9/00; F23N 5/003; F23R 3/26
 See application file for complete search history.

(56) References Cited

U.S. PATENT DOCUMENTS

| | | | |
|---|---|---|---|
| 3,866,411 A * | 2/1975 | Marion ................ F01K 23/068 60/780 |
| 4,043,395 A | 8/1977 | Every et al. ................ 166/263 |
| 4,050,239 A | 9/1977 | Kappler et al. ............. 60/39.51 |
| 4,160,640 A | 7/1979 | Maev et al. ...................... 431/9 |
| 4,171,349 A | 10/1979 | Cucuiat et al. ............... 423/574 |
| 4,204,401 A * | 5/1980 | Earnest .................. F01K 23/10 60/39.181 |
| 4,271,664 A * | 6/1981 | Earnest .................. F01K 23/10 60/39.181 |
| 4,344,486 A | 8/1982 | Parrish ........................ 166/272 |
| 4,414,334 A | 11/1983 | Hitzman ...................... 435/262 |
| 4,434,613 A | 3/1984 | Stahl ............................ 60/39.7 |
| 4,498,289 A | 2/1985 | Osgerby ..................... 60/39.52 |
| 4,528,811 A * | 7/1985 | Stahl ................... F01K 23/064 60/784 |
| 4,753,666 A | 6/1988 | Pastor et al. ..................... 62/24 |
| 4,762,543 A | 8/1988 | Pantermuehl et al. ........... 62/28 |
| 4,858,428 A | 8/1989 | Paul ............................ 60/39.17 |
| 4,895,710 A | 1/1990 | Hartmann et al. ............ 423/351 |
| 4,976,100 A | 12/1990 | Lee .............................. 60/39.02 |
| 5,014,785 A | 5/1991 | Puri et al. ..................... 166/263 |
| 5,085,274 A | 2/1992 | Puri et al. ..................... 166/252 |
| 5,123,248 A | 6/1992 | Monty et al. .................. 60/740 |
| 5,141,049 A | 8/1992 | Larsen et al. ................. 165/133 |
| 5,147,111 A | 9/1992 | Montgomery ................. 299/16 |
| 5,332,036 A | 7/1994 | Shirley et al. ................ 166/268 |
| 5,345,756 A | 9/1994 | Jahnke et al. ................ 60/39.02 |
| 5,388,395 A | 2/1995 | Scharpf et al. ............... 60/39.02 |
| 5,402,847 A | 4/1995 | Wilson et al. ................ 166/263 |
| 5,444,971 A | 8/1995 | Holenberger ................. 60/39.02 |
| 5,490,378 A | 2/1996 | Berger et al. ................. 60/39.23 |
| 5,566,756 A | 10/1996 | Chaback et al. .............. 166/263 |
| 5,707,593 A * | 1/1998 | Wang ..................... B01D 53/62 422/171 |
| 5,724,805 A | 3/1998 | Golomb et al. ............. 60/39.02 |
| 5,725,054 A | 3/1998 | Shayegi et al. .............. 166/263 |
| 5,901,547 A | 5/1999 | Smith et al. ................. 60/39.02 |
| 5,968,349 A | 10/1999 | Duyvesteyn et al. ........ 208/390 |
| 6,082,093 A | 7/2000 | Greenwood et al. ........ 60/39.23 |
| 6,089,855 A | 7/2000 | Becker et al. .................... 431/9 |
| 6,148,602 A * | 11/2000 | Demetri ............... F01K 23/068 60/39.12 |
| 6,201,029 B1 | 3/2001 | Waycuilis .................... 518/703 |
| 6,202,400 B1 | 3/2001 | Utamura et al. ............. 60/39.03 |
| 6,256,994 B1 | 7/2001 | Dillon ............................ 60/649 |
| 6,263,659 B1 * | 7/2001 | Dillon, IV ................ F02C 6/06 60/39.12 |
| 6,282,901 B1 | 9/2001 | Marin et al. ..................... 60/649 |
| 6,298,652 B1 | 10/2001 | Mittricker et al. .......... 60/39.02 |
| 6,298,654 B1 | 10/2001 | Vermes et al. ............... 60/39.02 |
| 6,298,664 B1 * | 10/2001 | Angsen ................... B01D 53/22 60/649 |
| 6,332,313 B1 | 12/2001 | Willis et al. ................. 60/39.06 |
| 6,345,493 B1 | 2/2002 | Smith et al. ................. 60/39.02 |
| 6,374,594 B1 | 4/2002 | Kraft et al. .................. 60/39.37 |
| 6,389,814 B2 | 5/2002 | Viteri et al. .................... 60/716 |
| 6,405,536 B1 | 6/2002 | Ho et al. ......................... 60/742 |
| 6,412,559 B1 | 7/2002 | Gunter et al. ................ 166/271 |
| 6,450,256 B2 | 9/2002 | Mones ..................... 166/250.01 |
| 6,477,859 B2 | 11/2002 | Wong et al. ..................... 62/617 |
| 6,487,863 B1 * | 12/2002 | Chen ........................ F02C 6/08 60/39.12 |
| 6,508,209 B1 | 1/2003 | Collier ............................. 123/3 |
| 6,598,402 B2 | 7/2003 | Kataoka et al. ................. 60/775 |
| 6,622,470 B2 * | 9/2003 | Viteri ..................... F01K 21/047 60/39.52 |
| 6,637,183 B2 | 10/2003 | Viteri et al. ................ 60/39.182 |
| 6,655,150 B1 * | 12/2003 | Angsen ............... B01D 53/1475 60/39.5 |
| 6,702,570 B2 | 3/2004 | Shah et al. ....................... 431/11 |
| 6,722,436 B2 | 4/2004 | Krill .............................. 166/303 |
| 6,745,573 B2 | 6/2004 | Marin et al. ..................... 60/775 |
| 6,790,030 B2 | 9/2004 | Fischer et al. ..................... 431/8 |
| 6,907,737 B2 | 6/2005 | Mittricker et al. ............. 60/772 |
| 6,910,335 B2 | 6/2005 | Viteri et al. ...................... 60/786 |
| 6,945,029 B2 | 9/2005 | Viteri ............................ 60/39.17 |
| 7,043,920 B2 | 5/2006 | Viteri et al. ...................... 60/716 |
| 7,065,953 B1 | 6/2006 | Kopko ............................ 60/39.3 |
| 7,089,743 B2 | 8/2006 | Frutschi et al. ................. 60/772 |
| 7,124,589 B2 | 10/2006 | Neary ............................. 60/784 |
| 7,143,572 B2 | 12/2006 | Ooka et al. .................. 60/39.182 |
| 7,147,461 B2 | 12/2006 | Neary ............................... 431/5 |
| 7,162,864 B1 * | 1/2007 | Schefer .................. F23C 99/00 123/1 A |
| 7,284,362 B2 | 10/2007 | Marin et al. ................ 60/39.182 |
| 7,305,831 B2 | 12/2007 | Carrea et al. .................... 60/772 |
| 7,353,655 B2 * | 4/2008 | Bolis ..................... F01K 21/047 60/39.281 |
| 7,357,857 B2 | 4/2008 | Hart et al. ..................... 208/391 |
| 7,363,756 B2 | 4/2008 | Carrea et al. .................. 60/39.52 |
| 7,401,577 B2 | 7/2008 | Saucedo et al. ............. 122/448.1 |
| 7,472,550 B2 | 1/2009 | Lear et al. ..................... 62/238.3 |
| 7,481,275 B2 | 1/2009 | Olsvik et al. ................. 166/303 |
| 7,490,472 B2 * | 2/2009 | Lynghjem ............... B01D 53/62 60/39.52 |
| 7,491,250 B2 | 2/2009 | Hershkowitz et al. ....... 48/198.7 |
| 7,503,178 B2 | 3/2009 | Bucker et al. .................. 60/774 |
| 7,516,626 B2 | 4/2009 | Brox et al. ....................... 62/643 |
| 7,536,873 B2 | 5/2009 | Nohlen .......................... 62/644 |
| 7,559,977 B2 | 7/2009 | Fleischer et al. ............... 95/236 |
| 7,566,394 B2 | 7/2009 | Koseoglu ...................... 208/309 |
| 7,637,093 B2 | 12/2009 | Rao ............................. 60/39.52 |
| 7,650,744 B2 | 1/2010 | Varatharajan et al. ....... 60/39.12 |
| 7,654,320 B2 | 2/2010 | Payton .......................... 166/257 |
| 7,752,848 B2 | 7/2010 | Chellappa et al. ............. 60/780 |
| 7,752,850 B2 | 7/2010 | Laster et al. .................... 60/794 |
| 7,762,084 B2 | 7/2010 | Martis et al. .................... 60/792 |

(56) References Cited

U.S. PATENT DOCUMENTS

| | | | |
|---|---|---|---|
| 7,765,810 B2 | 8/2010 | Pfefferle | 60/777 |
| 7,942,008 B2* | 5/2011 | Joshi | F02C 3/34 60/39.5 |
| 8,018,590 B2* | 9/2011 | Davis, Jr. | F23N 5/082 356/311 |
| 8,500,442 B2* | 8/2013 | Knittel | F23N 5/003 356/437 |
| 8,763,399 B2* | 7/2014 | Dodo | F23R 3/286 431/181 |
| 8,893,506 B2* | 11/2014 | Riensche | C01B 3/16 60/39.182 |
| 8,984,857 B2* | 3/2015 | Minta | F01K 23/068 166/402 |
| 9,463,417 B2* | 10/2016 | Oelkfe | F02C 1/08 |
| 10,041,672 B2* | 8/2018 | Zhdaneev | F23N 5/003 |
| 2001/0000049 A1* | 3/2001 | Kataoka | F02C 3/305 60/775 |
| 2001/0015061 A1 | 8/2001 | Viteri et al. | 60/39.161 |
| 2001/0023585 A1* | 9/2001 | Dolling | B01D 53/9431 60/286 |
| 2002/0036086 A1 | 3/2002 | Minkkinen et al. | 166/266 |
| 2002/0166323 A1 | 11/2002 | Marin et al. | 60/775 |
| 2003/0000436 A1 | 1/2003 | Vladimir | 110/347 |
| 2003/0131582 A1 | 7/2003 | Anderson et al. | 60/39.55 |
| 2003/0134241 A1 | 7/2003 | Marin et al. | 431/9 |
| 2003/0221409 A1 | 12/2003 | McGowan | 60/39.17 |
| 2003/0235529 A1 | 12/2003 | Hershkowitz et al. | 423/652 |
| 2004/0011054 A1* | 1/2004 | Inoue | F23R 3/10 60/776 |
| 2004/0050067 A1* | 3/2004 | Sprouse | F01K 21/047 60/774 |
| 2004/0065113 A1* | 4/2004 | Paradowski | F25J 1/0022 62/613 |
| 2004/0128975 A1 | 7/2004 | Viteri | 60/39.55 |
| 2004/0148941 A1 | 8/2004 | Wylie | 60/772 |
| 2004/0154793 A1 | 8/2004 | Zapadinski | 166/256 |
| 2004/0170558 A1 | 9/2004 | Hershkowitz | 423/652 |
| 2004/0170559 A1 | 9/2004 | Hershkowitz et al. | 423/652 |
| 2004/0175326 A1 | 9/2004 | Hershkowitz et al. | 423/652 |
| 2004/0180973 A1 | 9/2004 | Hershkowitz | 518/703 |
| 2004/0191166 A1 | 9/2004 | Hershkowitz et al. | 423/652 |
| 2004/0206090 A1* | 10/2004 | Yee | F23C 13/00 60/777 |
| 2004/0206091 A1 | 10/2004 | Yee et al. | 60/777 |
| 2004/0219079 A1* | 11/2004 | Hagen | F01K 21/047 422/607 |
| 2004/0241505 A1 | 12/2004 | Hershkowitz et al. | 429/17 |
| 2005/0022499 A1 | 2/2005 | Belokon et al. | 60/39.511 |
| 2005/0028529 A1* | 2/2005 | Bartlett | B01D 53/1475 60/772 |
| 2005/0056024 A1* | 3/2005 | Lieuwen | F23D 14/725 60/779 |
| 2005/0072161 A1* | 4/2005 | Chen | F02C 3/30 60/775 |
| 2005/0123874 A1 | 6/2005 | Abbasi et al. | 431/351 |
| 2005/0132713 A1 | 6/2005 | Neary | 60/784 |
| 2005/0137269 A1 | 6/2005 | Hershkowitz et al. | 518/702 |
| 2005/0144961 A1 | 7/2005 | Colibaba-Evulet et al. | 60/780 |
| 2005/0150231 A1* | 7/2005 | Laster | F02C 9/18 60/777 |
| 2005/0154068 A1 | 7/2005 | Hershkowitz et al. | 518/703 |
| 2005/0186130 A1 | 8/2005 | Hughes et al. | 423/219 |
| 2005/0197267 A1 | 9/2005 | Zaki et al. | 510/245 |
| 2005/0201929 A1 | 9/2005 | Hershkowitz et al. | 423/652 |
| 2005/0236602 A1 | 10/2005 | Viteri et al. | 252/372 |
| 2005/0252217 A1* | 11/2005 | Chen | F23R 3/14 60/776 |
| 2005/0268617 A1* | 12/2005 | Amond, III | F02C 9/34 60/776 |
| 2006/0005542 A1 | 1/2006 | Campbell et al. | 60/723 |
| 2006/0112696 A1 | 6/2006 | Lynghjem et al. | 60/772 |
| 2006/0127827 A1 | 6/2006 | Yoshida et al. | 431/8 |
| 2006/0183009 A1 | 8/2006 | Berlowitz et al. | 429/19 |
| 2006/0188760 A1 | 8/2006 | Hershkowitz et al. | 429/17 |
| 2006/0196812 A1 | 9/2006 | Beetge et al. | 208/435 |
| 2006/0231252 A1 | 10/2006 | Shaw et al. | 166/272.3 |
| 2006/0260290 A1 | 11/2006 | Rao | 60/39.53 |
| 2007/0003897 A1* | 1/2007 | Koizumi | F23R 3/28 431/354 |
| 2007/0006565 A1 | 1/2007 | Fleischer et al. | 60/39.5 |
| 2007/0006592 A1* | 1/2007 | Balan | F02C 3/22 60/772 |
| 2007/0034171 A1* | 2/2007 | Griffin | F01K 21/047 122/479.1 |
| 2007/0044479 A1 | 3/2007 | Brandt et al. | 60/783 |
| 2007/0113476 A1* | 5/2007 | Thomas | B01B 1/005 48/198.7 |
| 2007/0125063 A1 | 6/2007 | Evulat | 60/39.15 |
| 2007/0125091 A1* | 6/2007 | Roby | F02C 3/24 60/776 |
| 2007/0130957 A1* | 6/2007 | Hoffmann | C01B 3/38 60/780 |
| 2007/0144747 A1 | 6/2007 | Steinberg | 166/402 |
| 2007/0144940 A1 | 6/2007 | Hershkowitz et al. | 208/107 |
| 2007/0178035 A1 | 8/2007 | White et al. | 423/248 |
| 2007/0220864 A1 | 9/2007 | Haugen | 60/286 |
| 2007/0227155 A1* | 10/2007 | Nemet | F02C 9/00 60/772 |
| 2007/0227156 A1 | 10/2007 | Saito et al. | 60/772 |
| 2007/0234702 A1* | 10/2007 | Hagen | B60H 1/032 60/39.01 |
| 2007/0237696 A1 | 10/2007 | Payton | 423/228 |
| 2007/0240425 A1 | 10/2007 | Malavasi et al. | 60/775 |
| 2007/0245736 A1 | 10/2007 | Barnicki | 60/670 |
| 2007/0249738 A1 | 10/2007 | Haynes et al. | 518/702 |
| 2007/0251220 A1* | 11/2007 | Dawson | F01N 3/023 60/295 |
| 2007/0272201 A1 | 11/2007 | Amano et al. | 123/295 |
| 2007/0295640 A1 | 12/2007 | Tan et al. | 208/22 |
| 2008/0006561 A1 | 1/2008 | Moran et al. | 208/45 |
| 2008/0010967 A1 | 1/2008 | Griffin et al. | 60/39.182 |
| 2008/0016868 A1 | 1/2008 | Ochs et al. | 60/688 |
| 2008/0038598 A1 | 2/2008 | Berlowitz et al. | 429/17 |
| 2008/0066443 A1 | 3/2008 | Frutschi et al. | 60/39.53 |
| 2008/0083226 A1 | 4/2008 | Joshi et al. | 60/772 |
| 2008/0092539 A1 | 4/2008 | Marshall et al. | 60/599 |
| 2008/0104938 A1 | 5/2008 | Finkenrath et al. | 60/39.5 |
| 2008/0104939 A1 | 5/2008 | Hoffmann et al. | 60/39.5 |
| 2008/0104958 A1* | 5/2008 | Finkenrath | B01D 53/00 60/605.2 |
| 2008/0110177 A1* | 5/2008 | Pearce | F23N 5/00 60/776 |
| 2008/0115495 A1 | 5/2008 | Rising | 60/731 |
| 2008/0118310 A1 | 5/2008 | Graham | 405/129.95 |
| 2008/0120960 A1* | 5/2008 | Agnew | F02C 3/34 60/39.52 |
| 2008/0127632 A1 | 6/2008 | Finkenrath et al. | 60/274 |
| 2008/0134751 A1* | 6/2008 | Huang | G01F 1/667 73/23.2 |
| 2008/0134755 A1* | 6/2008 | Huang | G01F 1/668 73/24.01 |
| 2008/0141643 A1 | 6/2008 | Varatharajan et al. | 60/39.5 |
| 2008/0142409 A1 | 6/2008 | Sankaranarayanan et al. | 208/62 |
| 2008/0155984 A1 | 7/2008 | Liu et al. | 60/649 |
| 2008/0173584 A1 | 7/2008 | White et al. | 210/656 |
| 2008/0176174 A1* | 7/2008 | White | B01D 53/002 431/5 |
| 2008/0275278 A1 | 11/2008 | Clark | 585/240 |
| 2008/0290719 A1 | 11/2008 | Kaminsky et al. | 299/3 |
| 2008/0302107 A1 | 12/2008 | Fan et al. | 60/783 |
| 2008/0309087 A1* | 12/2008 | Evulet | F02C 3/34 290/52 |
| 2008/0317651 A1 | 12/2008 | Hooper et al. | 423/230 |
| 2009/0013693 A1* | 1/2009 | Ols | F23N 1/005 60/735 |
| 2009/0038247 A1 | 2/2009 | Taylor et al. | 52/287.1 |
| 2009/0064653 A1 | 3/2009 | Hagen et al. | 60/39.3 |
| 2009/0064758 A1 | 3/2009 | Walter et al. | |
| 2009/0100754 A1 | 4/2009 | Gil | 48/201 |
| 2009/0117024 A1 | 5/2009 | Weedon et al. | 423/437.1 |

(56) References Cited

U.S. PATENT DOCUMENTS

| | | | | |
|---|---|---|---|---|
| 2009/0133400 A1 | 5/2009 | Callas | | 60/730 |
| 2009/0145127 A1 | 6/2009 | Vollmer et al. | | 60/618 |
| 2009/0193809 A1* | 8/2009 | Schroder | | F02C 3/22 |
| | | | | 60/726 |
| 2009/0194280 A1 | 8/2009 | Gil et al. | | 166/267 |
| 2009/0205334 A1 | 8/2009 | Aljabari et al. | | 60/605.2 |
| 2009/0218821 A1 | 9/2009 | ElKady et al. | | 290/52 |
| 2009/0223226 A1* | 9/2009 | Koizumi | | F02C 3/22 |
| | | | | 60/736 |
| 2009/0223229 A1* | 9/2009 | Wang | | B01D 53/228 |
| | | | | 60/780 |
| 2009/0235671 A1 | 9/2009 | Rabovitser et al. | | 60/806 |
| 2009/0241506 A1 | 10/2009 | Nilsson | | 60/39.24 |
| 2009/0250264 A1 | 10/2009 | Dupriest | | 175/40 |
| 2009/0284013 A1* | 11/2009 | Anand | | B01D 53/8625 |
| | | | | 290/52 |
| 2009/0301054 A1 | 12/2009 | Simpson et al. | | 60/39.15 |
| 2009/0301099 A1* | 12/2009 | Nigro | | F01K 23/106 |
| | | | | 60/775 |
| 2010/0018218 A1 | 1/2010 | Riley et al. | | 60/783 |
| 2010/0028142 A1 | 2/2010 | Hashimoto et al. | | 415/200 |
| 2010/0064855 A1 | 3/2010 | Lanyi et al. | | 75/458 |
| 2010/0077941 A1 | 4/2010 | D'Agostini | | 110/188 |
| 2010/0115960 A1* | 5/2010 | Brautsch | | F02C 3/30 |
| | | | | 60/772 |
| 2010/0126176 A1 | 5/2010 | Kim | | 60/748 |
| 2010/0162703 A1 | 7/2010 | Li et al. | | 60/670 |
| 2010/0180565 A1 | 7/2010 | Draper | | 60/39.52 |
| 2010/0310439 A1 | 12/2010 | Brok et al. | | 423/222 |
| 2010/0313572 A1* | 12/2010 | McManus | | F02C 9/00 |
| | | | | 60/773 |
| 2010/0314136 A1 | 12/2010 | Zubrin et al. | | 166/402 |
| 2010/0326084 A1* | 12/2010 | Anderson | | F01K 23/10 |
| | | | | 60/775 |
| 2011/0000221 A1 | 1/2011 | Minta et al. | | 60/783 |
| 2011/0023488 A1 | 2/2011 | Fong et al. | | 60/659 |
| 2011/0027018 A1 | 2/2011 | Baker et al. | | 405/128.6 |
| 2011/0037276 A1* | 2/2011 | Hoffmann | | F02C 9/22 |
| | | | | 290/40 C |
| 2011/0067408 A1* | 3/2011 | Maly | | F02C 9/28 |
| | | | | 60/772 |
| 2011/0162382 A1* | 7/2011 | Riensche | | C01B 3/16 |
| | | | | 60/781 |
| 2011/0219777 A1 | 9/2011 | Wijmans et al. | | 60/772 |
| 2011/0289898 A1* | 12/2011 | Hellat | | F01K 23/10 |
| | | | | 60/39.52 |
| 2011/0300493 A1* | 12/2011 | Mittricker | | F23C 9/00 |
| | | | | 431/12 |
| 2011/0302922 A1* | 12/2011 | Li | | F01K 23/101 |
| | | | | 60/645 |
| 2011/0314815 A1* | 12/2011 | Li | | F01K 23/105 |
| | | | | 60/645 |
| 2012/0023955 A1* | 2/2012 | Draper | | F02C 3/34 |
| | | | | 60/772 |
| 2012/0023960 A1* | 2/2012 | Minto | | F02C 3/34 |
| | | | | 60/772 |
| 2012/0055331 A1* | 3/2012 | Steele | | C01B 3/36 |
| | | | | 95/8 |
| 2012/0090328 A1* | 4/2012 | Benz | | B01D 53/002 |
| | | | | 60/772 |
| 2012/0131925 A1* | 5/2012 | Mittricker | | F23C 9/00 |
| | | | | 60/772 |
| 2012/0186268 A1* | 7/2012 | Rofka | | F02C 3/34 |
| | | | | 60/783 |
| 2012/0240590 A1* | 9/2012 | Hellat | | F01D 25/08 |
| | | | | 60/772 |
| 2012/0272657 A1* | 11/2012 | Baker | | B01D 53/22 |
| | | | | 60/772 |
| 2012/0291445 A1* | 11/2012 | Rofka | | F02C 3/13 |
| | | | | 60/772 |
| 2013/0047576 A1* | 2/2013 | Sander | | F02C 3/34 |
| | | | | 60/39.182 |
| 2013/0074515 A1* | 3/2013 | Widener | | F02C 3/30 |
| | | | | 60/780 |
| 2013/0086883 A1* | 4/2013 | Sander | | F02C 3/34 |
| | | | | 60/39.52 |
| 2013/0091853 A1* | 4/2013 | Denton | | F02C 1/007 |
| | | | | 60/772 |
| 2013/0091854 A1* | 4/2013 | Gupta | | F02C 1/007 |
| | | | | 60/772 |
| 2013/0104562 A1* | 5/2013 | Oelfke | | F02C 1/007 |
| | | | | 60/773 |
| 2013/0104563 A1* | 5/2013 | Oelfke | | F02C 1/007 |
| | | | | 60/773 |
| 2013/0125554 A1* | 5/2013 | Mittricker | | F01K 23/10 |
| | | | | 60/772 |
| 2013/0255267 A1* | 10/2013 | ElKady | | F23R 3/26 |
| | | | | 60/772 |
| 2013/0269356 A1* | 10/2013 | Butkiewicz | | F02C 3/34 |
| | | | | 60/772 |
| 2013/0327050 A1* | 12/2013 | Slobodyanskiy | | F23L 7/00 |
| | | | | 60/772 |
| 2014/0230445 A1* | 8/2014 | Huntington | | F01K 23/10 |
| | | | | 60/772 |
| 2014/0290264 A1* | 10/2014 | Hovel | | F02C 9/16 |
| | | | | 60/772 |
| 2014/0374109 A1* | 12/2014 | Denton | | B01D 53/62 |
| | | | | 166/309 |
| 2015/0240715 A1* | 8/2015 | Dhanuka | | F02C 3/22 |
| | | | | 60/780 |
| 2015/0267649 A1* | 9/2015 | Remes | | F01N 3/20 |
| | | | | 60/605.2 |
| 2015/0336054 A1* | 11/2015 | Rollins | | C01B 21/0438 |
| | | | | 95/47 |
| 2015/0338278 A1* | 11/2015 | Kramer | | F02D 35/022 |
| | | | | 415/118 |
| 2016/0010493 A1* | 1/2016 | O'Dea | | F23N 5/18 |
| | | | | 60/776 |

FOREIGN PATENT DOCUMENTS

| | | | | |
|---|---|---|---|---|
| CA | 2550675 | 7/2005 | | F02C 3/34 |
| CA | 2645450 | 9/2007 | | C01G 1/00 |
| CA | 2614669 | 12/2008 | | B03B 9/02 |
| EA | 000254 | 2/1999 | | |
| EA | 005887 | 6/2005 | | |
| EP | 0453059 | 6/1994 | | F01K 23/06 |
| EP | 0654639 | 9/1998 | | F23R 3/14 |
| EP | 1013897 A1 * | 6/2000 | | F01K 23/064 |
| EP | 1952874 | 8/2008 | | |
| GB | 2117053 | 2/1983 | | F02C 3/22 |
| GB | 2397349 | 7/2004 | | F02C 3/22 |
| JP | 10-132739 | 5/1998 | | |
| JP | 2001-207833 | 8/2001 | | |
| WO | WO1995/021683 | 8/1995 | | B01D 53/14 |
| WO | WO1997/007329 | 2/1997 | | F02C 6/00 |
| WO | 97/22793 | 6/1997 | | |
| WO | WO1999/006674 | 2/1999 | | F01K 23/10 |
| WO | WO1999/063210 | 12/1999 | | F02C 3/34 |
| WO | 2001/090548 | 11/2001 | | |
| WO | 03/056165 | 7/2003 | | |
| WO | WO2005/064232 | 7/2005 | | F23C 6/04 |
| WO | WO2006/107209 | 10/2006 | | F01K 23/00 |
| WO | WO2007/068682 | 6/2007 | | E21B 43/16 |
| WO | WO2008/074980 | 6/2008 | | C01B 3/38 |
| WO | WO2008/142009 | 11/2008 | | |
| WO | WO2008/155242 | 12/2008 | | F02C 3/34 |
| WO | WO2009/120779 | 10/2009 | | F02B 17/00 |
| WO | WO2009/121008 | 10/2009 | | B01J 15/00 |
| WO | 2010044958 | 4/2010 | | |
| WO | WO2010/044958 | 4/2010 | | F02C 9/00 |
| WO | WO 2010044958 A1 * | 4/2010 | | F23C 9/00 |
| WO | WO2010/066048 | 6/2010 | | F22B 1/22 |
| WO | 2010/072729 | 7/2010 | | |
| WO | WO 2010072710 A2 * | 7/2010 | | F01K 23/101 |
| WO | WO2010/141777 | 12/2010 | | F02C 9/00 |
| WO | WO2011/028322 | 3/2011 | | E21B 43/40 |
| WO | WO2011/028356 | 3/2011 | | F01K 13/00 |
| WO | WO2012/003076 | 1/2012 | | F02C 7/08 |

(56) References Cited

FOREIGN PATENT DOCUMENTS

| WO | WO2012/003077 | 1/2012 | ............... F02C 6/00 |
|----|---------------|--------|---------------------------|
| WO | WO2012/003078 | 1/2012 | ............... F02C 3/34 |
| WO | WO2012/003079 | 1/2012 | ............... F02C 3/34 |
| WO | WO2012/003080 | 1/2012 | ............... F02C 6/00 |
| WO | WO2012/003489 | 1/2012 | ............... F16K 3/28 |
| WO | WO2012/018457 | 2/2012 | ............... F02C 3/20 |
| WO | WO2012/018458 | 2/2012 | ............... F02C 3/00 |

OTHER PUBLICATIONS

"Fuel mixture indicator" article, Great Soviet Encyclopedia—Moscow, 'Soviet Encyclopedia' Publisher, 1969-1978.
Ahmed, S. et al. (1998) "Catalytic Partial Oxidation Reforming of Hydrocarbon Fuels," *1998 Fuel Cell Seminar*, Nov. 16-19, 1998, 7 pgs.
Anderson, R. E. (2006) "Durability and Reliability Demonstration of a Near-Zero-Emission Gas-Fired Power Plant," *California Energy Comm., CEC 500-2006-074*, 80 pgs.
Baxter, E. et al. (2003) "Fabricate and Test an Advanced Non-Polluting Turbine Drive Gas Generator," *U. S. Dept. of Energy, Nat'l Energy Tech. Lab., DE-FC26-00NT 40804*, 51 pgs.
Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.
BP Press Release (2006) "BP and Edison Mission Group Plan Major Hydrogen Power Project for California," Feb. 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering And Technology*, 9 pgs.
Clark, Hal (2002) "Development of a Unique Gas Generator for a Non-Polluting Power Plant," *California Energy Commission Feasibility Analysis, P500-02-011F*, Mar. 2002, 42 pgs.
Defrate, L. A. et al. (1959) "Optimum Design of Ejector Using Digital Computers" *Chem. Eng. Prog. Symp. Ser.*, 55 (21) pp. 46.
Ditaranto, M. et al. (2006) "Combustion Instabilities in Sudden Expansion Oxy-Fuel Flames," *ScienceDirect, Combustion and Flame*, vol. 146, Jun. 30, 2006, pp. 493-451.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Ertesvag, I. S. et al. (2005) "Exergy Analysis of a Gas-Turbin Combined-Cycle Power Plant With Precombustion $CO_2$ Capture," Elsivier, 2004, pp. 5-39.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Snarheim, D. et al. (2006) "Control Design for a Gas Turbine Cycle With $CO_2$ Capture Capabilities," *Modeling, Identification And Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
VanHemert, P. et al. (2006) "Adsorption of Carbon Dioxide and a Hydrogen-Carbon Dioxide Mixture," *Intn'l Coalbed Methane Symposium (Tuscaloosa, AL) Paper 0615*, 9 pgs.
Zhu, J. et al. (2002) "Recovery of Coalbed Methane by Gas Injection," *SPE 75255*, 15 pgs.
PCT/US2010/037325 International Search Report dated Aug. 16, 2010.
Baukal Industrial Burners Handbook (2003) pp. 1-757.
PCT/US2011/042870 International Search Report and Written Opinion dated Dec. 6, 2011.

\* cited by examiner

SYSTEMS AND METHODS FOR CONTROLLING COMBUSTION OF A FUEL

CROSS REFERENCE TO RELATED APPLICATIONS

This application is a United States National Phase Application of International Patent Application No. PCT/US/2011/042870, filed on Jul. 1, 2011, which claims the benefit of U.S. Provisional Patent Application having Ser. No. 61/361,169, filed on Jul. 2, 2010, both of which are incorporated by reference herein.

FIELD

Embodiments of the present disclosure generally relate to systems and methods for combusting a fuel. More particularly, embodiments of the disclosure relate to systems and methods for controlling the composition of an exhaust gas produced by combusting a fuel.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

The combustion of fuel within a combustor, e.g., a combustor integrated with a gas turbine, is conventionally controlled by monitoring the temperature of the exhaust gas. At full load, typical gas turbines adjust the amount of fuel introduced to the combustor in order to reach a desired combustion gas or exhaust gas temperature. Conventional combustion turbines control the oxidant introduced thereto using inlet guide vanes. At partial load, the amount of oxidant introduced to the combustor is reduced and the amount of fuel introduced is again controlled to reach the desired exhaust gas temperature. At partial load, the efficiency of gas turbines drops because the ability to reduce the amount of oxidant is limited by the inlet guide vanes, which are only capable of slightly reducing the flow of oxidant. Additionally, there are also potential problems with lean blow out at partial load operations.

Controlling the amount of oxidant introduced to the combustor can be desirable when an objective is to capture carbon dioxide ($CO_2$) from the exhaust gas. Current carbon dioxide capture technology is expensive due to several reasons. One reason is due to the low pressure and low concentration of carbon dioxide in the exhaust gas. The carbon dioxide concentration, however, can be significantly increased from about 4% to greater than 10% by operating the combustion process under stoichiometric or substantially stoichiometric conditions and recycling at least a portion of the exhaust gas to the combustor as a diluent in order to adjust the temperature of the exhaust gas. Also, in oxy-fuel combustion processes, the control of the oxidant is also critical since any unused oxygen in the exhaust gas is a contaminate in the captured carbon dioxide that restricts the type of solvents that can be utilized for the capture of carbon dioxide.

Controlling the combustion process via temperature monitoring, provides very little, if any, control over the composition of the exhaust gas and more particularly the amount of oxygen ($O_2$) in the exhaust gas. The concentration of oxygen in the exhaust gas can fluctuate due to changes in the amount and/or composition of the fuel being combusted. Consequently, the temperature monitoring approach to controlling combustion is not desirable when the objective is to control the presence and concentrations of particular the components/compounds in the exhaust gas, for example oxygen.

The foregoing discussion of need in the art is intended to be representative rather than exhaustive. A technology addressing one or more such needs, or some other related shortcoming in the field, would benefit combustion systems and methods for controlling the composition of a combustion exhaust gas.

SUMMARY

The present disclosure provides systems and methods for combusting a fuel. Exemplary methods include introducing a fuel, an oxidant, and a diluent to a combustion zone and combusting at least a portion of the fuel to produce an exhaust gas comprising water, carbon dioxide, oxygen, and carbon monoxide. The exhaust gas may be expanded to produce mechanical power and an expanded exhaust gas. A concentration of at least one of oxygen and carbon monoxide is determined in at least one of the exhaust gas and the expanded exhaust gas. The method continues by adjusting an amount of at least one of the oxidant and the fuel introduced to the combustion zone based at least in part on the determined concentration of at least one of oxygen and carbon monoxide to produce an exhaust gas containing a combined amount of oxygen and carbon monoxide of less than about 2 mol %.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Figure 1:
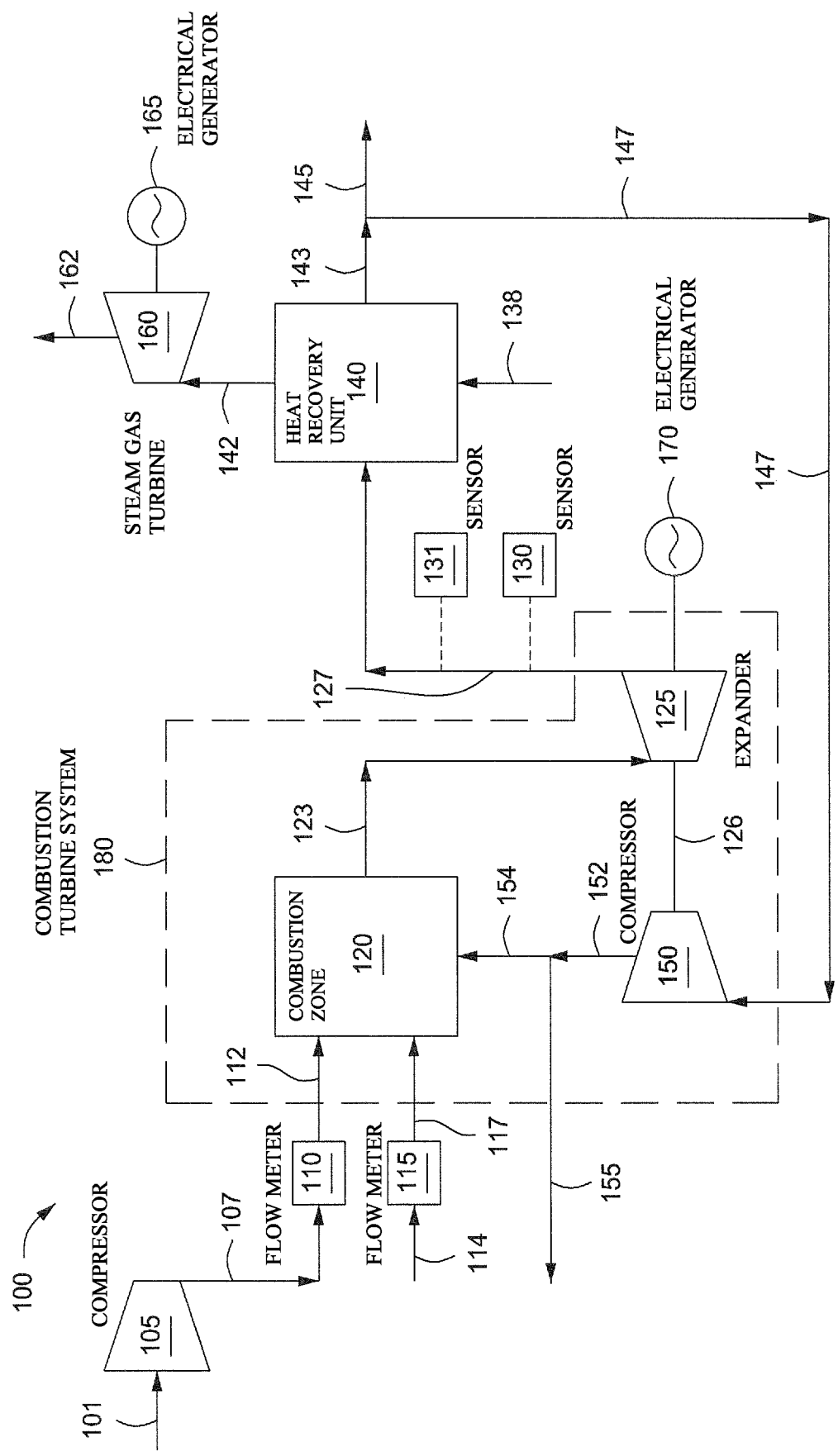
FIG. 1 depicts a schematic of an illustrative combustion and power generation system for controlling the composition of a combustion gas produced from a combustion process and producing mechanical power, according to one or more embodiments described.

FIG. 1 depicts schematic of an illustrative combustion and power generation system 100 for controlling the composition of a combustion gas or "exhaust gas" produced from a combustion process and producing mechanical power, according to one or more embodiments. The system 100 can include, but is not limited to, one or more combustors or combustion zones (one is shown) 120, expanders (one is shown) 125, heat recovery units (one is shown) 140, compressors (two are shown) 105, 150, steam gas turbines 160, and electrical generators (two are shown) 165, 170.

An oxidant via line 101 can be introduced to the compressor 105 or directly to the combustor 120. The flow rate of the compressed oxidant in line 107 can be controlled, adjusted, or otherwise altered via a flow meter ("first flow meter") 110. The compressed oxidant in line 107 can be at a pressure ranging from about 400 kPa to about 4500 kPa. The compressed oxidant in line 107 can be at a temperature ranging from about 30° C. to about 500° C.

A second flow meter ("fuel flow meter") 115 can control, adjust, or otherwise alter via the amount of fuel via line 117 that is introduced to the combustor 120. Although not shown, the oxidant in line 112 and the fuel in line 117 can be at least partially mixed or otherwise combined to provide an oxidant/fuel mixture that is introduced to the combustor 120.

At least a portion of the fuel introduced via line 114 can be combusted to produce a combustion gas or exhaust gas via line 123. The exhaust gas can include, but is not limited to, fuel, oxygen, carbon monoxide, carbon dioxide, hydrogen, nitrogen, nitrogen oxides, argon, water, steam, or any combination thereof. The exhaust gas in line 123 can have a temperature ranging from about 1000° C. to about 1,500° C. and a pressure ranging from about 400 kPa to about 4,500 kPa.

The exhaust gas via line 123 can be introduced to the expander 125 to produce an expanded exhaust gas via line 127. The expanded exhaust gas in line 127 can have a temperature ranging from about 430° C. to about 725° C. and a pressure of from about 101 kPa to about 110 kPa.

The expanded exhaust gas via line 127 can be introduced to, contacted with, or otherwise accessed by one or more exhaust gas sensors (two are shown 130, 131). The exhaust gas sensors 130, 131 can estimate, determine, detect, or otherwise measure the presence and/or concentration of any one or more components that could be present in the exhaust gas and/or any one or more properties of the exhaust gas. The exhaust gas via line 127 can be introduced to the heat recovery unit 140 to produce a cooled exhaust gas via line 143 and a heated heat transfer medium via line 142. Although not shown, any one or more of the exhaust gas sensors 130, 131 can be in communication with the exhaust gas in line 123 rather than or in addition to the expanded exhaust gas in line 127.

Illustrative exhaust gas components that can be estimated can include, but are not limited to, oxygen, carbon monoxide, water (liquid water, gaseous water, or a combination thereof), carbon dioxide, nitrogen, nitrogen oxides, argon, fuel, oxidant, hydrogen, or any combination thereof. As used herein, the term "nitrogen oxides" refers to nitrogen containing compounds. Illustrative nitrogen oxides can include, but are not limited to, nitric oxide (NO), nitrogen dioxide ($NO_2$), or a combination thereof. Illustrative properties of the exhaust gas that can be estimated can include, but are not limited to, temperature, pressure, density, flow rate such as the mass and/or volumetric flow rate, or any combination thereof.

In one or more embodiments, the exhaust gas sensor 130 can analyze one or more of the components in the expanded exhaust gas in line 127 and the exhaust gas sensor 131 can estimate the temperature of the expanded exhaust gas in line 127. For example, the exhaust gas sensor 130 can estimate the concentration of oxygen and/or carbon monoxide in the expanded exhaust gas in line 127. In another example, the exhaust gas sensor 131 can estimate the temperature of the expanded exhaust gas in line 127. As such, the exhaust gas sensors 130, 131 can be dedicated for measuring different properties and/or components of the exhaust gas in line 127.

In one or more embodiments, both the exhaust gas sensors 130, 131 can be configured to estimate the same component(s) and/or property(ies), different component(s) and/or property(ies), or a combination of some same component(s) and/or property(ies) and different component(s) and/or property(ies). For example, the exhaust gas sensor 130 can estimate the oxygen and/or carbon dioxide concentration and pressure of the expanded exhaust gas in line 127 and the exhaust gas sensor 131 can estimate the temperature and pressure of the expanded exhaust gas in line 127. In one or more embodiments, only one exhaust gas sensor, e.g. exhaust gas sensor 130, can be used and the single exhaust gas sensor 130 can be configured to estimate any one or more components and/or properties of the expanded exhaust gas in line 127.

Illustrative oxygen sensors can include, but are not limited to, lambda and/or wideband zirconia oxygen sensors, titania sensors, galvanic, infrared, or any combination thereof. Illustrative temperature sensors can include, but are not limited to, thermocouples, resistive temperature devices, infrared sensors, or any combination thereof. Illustrative carbon monoxide sensors can include, but are not limited to, oxide based film sensors such as barium stannate and/or titanium dioxide. For example, a carbon monoxide sensor can include platinum-activated titanium dioxide, lanthanum stabilized titanium dioxide, and the like.

Figure 2A:
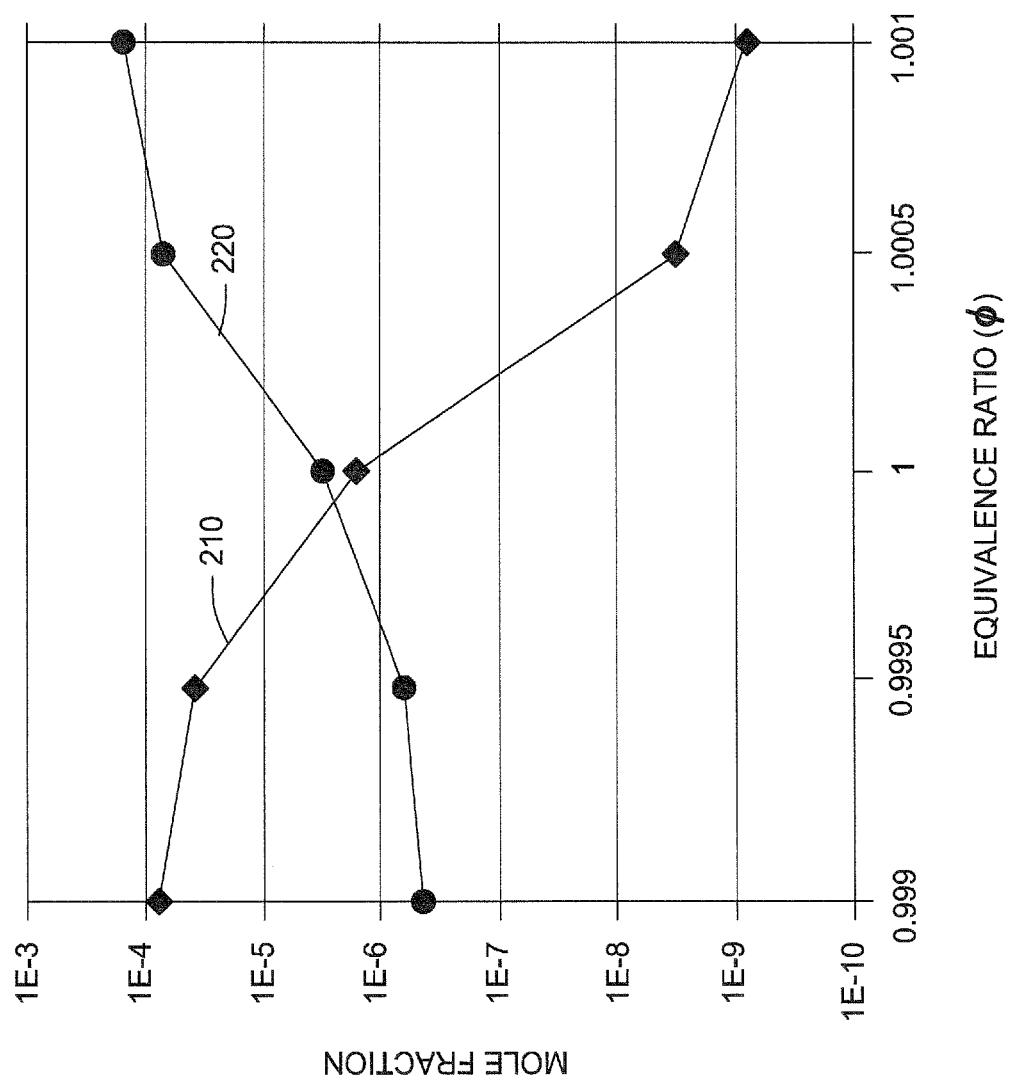
FIGS. 2A and 2B are graphical depictions of a simulation showing the relationship between the concentration of oxygen and carbon monoxide as the equivalence ratio ($\phi$) changes from 0.999 to 1.001 and from 0.75 to 1.25, respectively.
Figure 2B:
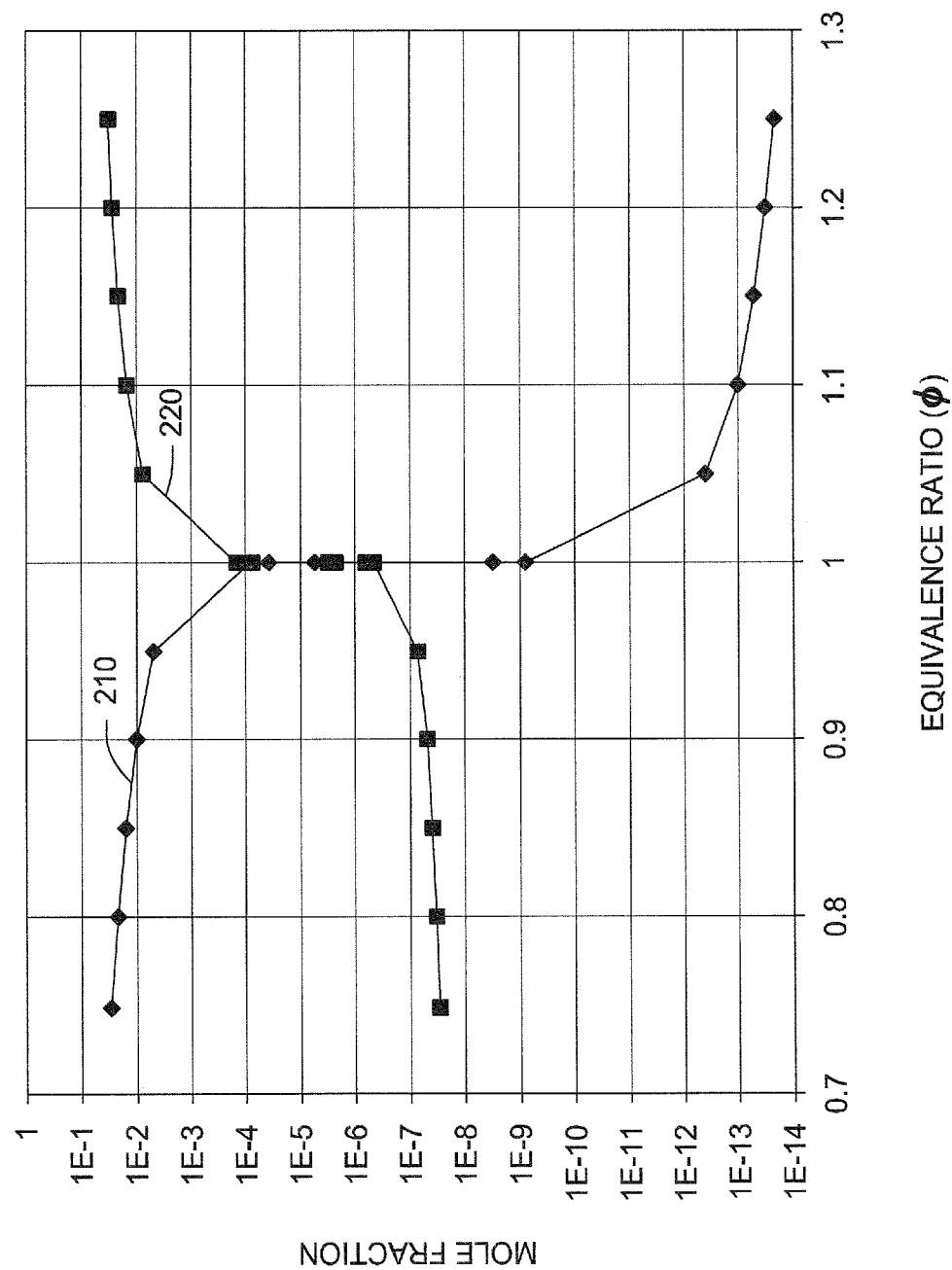

FIGS. 2A and 2B are graphical depictions of a simulation showing the relationship between the concentration of oxygen and carbon monoxide as the equivalence ratio ($\phi$) changes from 0.999 to 1.001 and from 0.75 to 1.25, respectively. The oxygen concentration as a function of the equivalence ratio is shown as line 210 and the carbon monoxide concentration as a function of the equivalence ration is shown as line 220. The equivalence ratio ($\phi$) is equal to (mol % fuel/mol % oxidant)$_{actual}$/(mol % fuel/mol % oxidant)$_{stoichiometric}$. The mol % fuel is equal to $F_{fuel}$/($F_{oxidant}$+$F_{fuel}$), where $F_{fuel}$ is equal to the molar flow rate of fuel and $F_{oxidant}$ is equal to the molar flow rate of oxidant. The mol % oxidant is equal to $F_{oxidant}$/($F_{oxidant}$+$F_{fuel}$), where $F_{oxidant}$ is equal to the molar flow rate of oxidant and $F_{fuel}$ is equal to the molar flow rate of fuel. As the equivalence ratio ($\phi$) goes below 1 or above 1 the mole fraction or concentration of oxygen and carbon dioxide in the exhaust gas change. For example, as the equivalence ratio ($\phi$) goes below 1 the mole fraction of oxygen rapidly increases from about 1 ppm (i.e. an oxygen mole fraction of about $1.0 \times 10^{-6}$) at an equivalence ratio ($\phi$) of about 1 to about 100 ppm (i.e. an oxygen mole fraction of about $1 \times 10^{-4}$) at an equivalence ratio of about 0.999. Similarly, as the equivalence ratio ($\phi$) goes above 1 the concentration of carbon monoxide rapidly increase from about 1 ppm (i.e. carbon monoxide mole fraction of about $1 \times 10^{-6}$) at an equivalence ratio ($\phi$) of about 0.9995 to greater than about 100 ppm (i.e. a carbon monoxide mole fraction of about $1 \times 10^{-4}$) at an equivalence ratio ($\phi$) of about 1.001.

Based, at least in part, on the information or data provided from the exhaust gas sensor 130 and/or 131 the amount of oxidant via line 112 and/or the amount of fuel via line 117 can be altered, modified, adjusted, or otherwise controlled to produce an exhaust gas via line 123 having a desired composition. It has been surprisingly and unexpectedly discovered that by monitoring the oxygen and/or carbon monoxide concentration in the exhaust gas in line 123 and/or the expanded exhaust gas in line 127 the amount of oxidant via line 112 and/or fuel via line 117 introduced to the combustor 120 can be controlled such that combustion of the fuel is carried out within a predetermined range of equivalence ratios ($\phi$) to produce an exhaust gas having a combined concentration of oxygen and carbon monoxide of less than about 3 mol %, less than about 2.5 mol %, less than about 2 mol %, less than about 1.5 mol %, less than about 1 mol %, or less than about 0.5 mol %. Furthermore, it has been surprisingly and unexpectedly discovered that by monitoring the oxygen and/or carbon monoxide concentration in the exhaust gas in line 123 and/or the expanded exhaust gas in line 127 the amount of oxidant via line 112 and/or the fuel via line 117 introduced to the combustor 120 can be controlled such that combustion of the fuel is carried out within a predetermined range of equivalence ratios ($\phi$) to produce an exhaust gas having less than about 4,000 ppm, less than about 2,000 ppm, less than about 1,000 ppm, less than about 500 ppm, less than about 250 ppm, or less than about 100 ppm combined oxygen and carbon monoxide.

The desired or predetermined range for the equivalence ratio ($\phi$) that can be used carry out the combustion of the fuel in line 112 to produce an exhaust gas containing a desired amount of oxygen and/or carbon monoxide in the exhaust gas in line 123. For example, the equivalence ratio ($\phi$) can be maintained within a predetermined range of from about 0.85 to about 1.15 to produce an exhaust via line 123 having a combined oxygen and carbon monoxide concentration ranging from a low of about 0.5 mol %, about 0.8 mol %, or about 1 mol %, to a high of about 1.5 mol %, about 1.8 mol %, about 2 mol %, or about 2.2 mol %. In another example, the equivalence ratio ($\phi$) can be maintained within a range of about 0.85 to about 1.15 to produce an exhaust gas via line 123 having a combined oxygen and carbon monoxide concentration of less than 2 mol %, less than 1.9 mol %, less than about 1.7 mol %, less than about 1.4 mol %, less than about 1.2 mol %, or less than about 1 mol %. In still another example, the equivalence ratio ($\phi$) can be maintained within a range of from about 0.96 to about 1.04 to produce an exhaust gas via line 123 having a combined oxygen and carbon monoxide concentration of less than about 4,000 ppm, less than about 3,000 ppm, less than about 2,000 ppm, less than about 1,000 ppm, less than about 500 ppm, less than about 250 ppm, or less than about 100 ppm.

Referring to FIGS. 1, 2A, and 2B, one method for combusting the fuel within the combustor 120 can include initially, i.e. on start-up, introducing the fuel via line 117 and oxidant via line 112 at an equivalence ratio greater than 1. For example, the fuel via line 117 and oxidant via line 112 can be initially introduced to the combustor 120 at an equivalence ratio ($\phi$) ranging from a low of about 1.0001, about 1.0005, about 1.001, about 1.05, or about 1.1, to a high of about 1.1, about 1.2, about 1.3, about 1.4, or about 1.5. In another example, the equivalence ratio ($\phi$) can range from about 1.0001 to about 1.1, from about 1.0005 to about 1.01, from about 1.0007 to about 1.005, or from about 1.01 to about 1.1. The concentration of oxygen and/or carbon monoxide in the exhaust gas in line 123 or, as shown, the expanded exhaust gas in line 127 can be determined or estimated via the gas sensor 130. The expanded exhaust gas in line 127 should initially have a high concentration of carbon monoxide (e.g., greater than about 1,000 ppm or greater than about 10,000 ppm) and a low concentration of oxygen (e.g., less than about 10 ppm or less than about 1 ppm).

Another method for combusting the fuel within the combustor 120 can include initially, i.e. on start-up, introducing the fuel via line 117 and oxidant via line 112 at an equivalence ratio of less than 1. For example, the fuel via line 117 and oxidant via line 112 can be initially introduced to the combustor 120 at an equivalence ratio ($\phi$) ranging from a low of about 0.5, about 0.6, about 0.7, about 0.8, or about 0.9 to a high of about 0.95, about 0.98, about 0.99, about 0.999. In another example, the equivalence ratio ($\phi$) can range from about 0.9 to about 0.999 from about 0.95 to about 0.99, from about 0.96 to about 0.99, or from about 0.97 to about 0.99. The concentration of oxygen and/or carbon monoxide in the exhaust gas in line 123 or, as shown, the expanded exhaust gas in line 127 can be determined or estimated via the exhaust gas sensor 130. The expanded exhaust gas in line 127 should initially have a high concentration of oxygen (e.g., greater than about 1,000 ppm or greater than about 10,000 ppm) and a low concentration of carbon monoxide (e.g., less than about 10 ppm or even less than about 1 ppm).

For example, when the concentration of oxidant in the exhaust gas increases from less than about 1 ppm to greater than about 100 ppm, about 1,000 ppm, about 1 mol %, about 2 mol %, about 3 mol %, or about 4 mol %, an operator, an automated control system, or both can be alerted that an equivalence ratio ($\phi$) of less than 1 has been reached. In one or more embodiments, the amount of oxidant via line 112 and fuel via line 117 can be maintained constant or substantially constant to provide a combustion process having an equivalence ratio ($\phi$) of slightly less than 1, e.g., about 0.99. The amount of oxidant via line 112 can be decreased and/or the amount of fuel via line 117 can be increased and then maintained at a constant or substantially constant amount to provide a combustion process having an equivalence ratio ($\phi$) falling within a predetermined range. For example, when the concentration of oxygen increases from less than about 1 ppm to about 1,000 ppm, about 0.5 mol %, about 2 mol %, or about 4 mol %, the amount of oxidant via line 112 can be reduced or decreased by an amount ranging from a low of about 0.01%, about 0.02%, about 0.03%, or about 0.04 to a high of about 1%, about 2%, about 3%, or about 5% relative to the amount of oxidant via line 112 introduced at the time the increase in oxygen in the exhaust gas is initially detected. In another example, when the concentration of oxygen increases from less than about 1 ppm to about 1,000 ppm or more the amount of oxidant via line 112 can be reduced or decreased by about 0.01% to about 2%, about 0.03% to about 1%, or about 0.05% to about 0.5% relative to the amount of oxidant via line 112 introduced at the time the increase in oxygen in the exhaust gas is detected. In still another example, when the concentration of oxygen increases from less than about 1 ppm to about 1,000 ppm or more the amount of fuel via line 117 can be increased by an amount ranging from a low of about 0.01%, about 0.02%, about 0.03%, or about 0.04 to a high of about 1%, about 2%, about 3%, or about 5% relative to the amount of fuel via line 117 introduced at the time the increase in oxygen in the exhaust gas is initially detected.

During operation of the combustion and power generation system 100, the equivalence ratio ($\phi$) can be monitored via the exhaust gas sensor 130 on a continuous basis, at periodic time intervals, at random or non-periodic time intervals, when one or more changes to the system 100 occur that could alter or change the equivalence ratio ($\phi$) of the exhaust gas in line 123, or any combination thereof. Illustrative changes that could occur to the system 100 that could alter or change the equivalence ratio ($\phi$) can include, but are not limited to, a change in the composition of the fuel, a change in the composition of the oxidant, or a combination thereof. As such, the concentration of oxygen and/or carbon monoxide, for example, can be monitored and adjustments to the amount of oxidant via line 112 and/or fuel via line 117 can be made in order to control or adjust the amounts of oxygen and/or carbon monoxide in the exhaust gas in line 123.

In at least one embodiment, reducing the equivalence ratio ($\phi$) can be carried out in incremental steps, non-incremental steps, a continuous manner, or any combination thereof. For example, the amount of oxidant via line 112 and/or the fuel via line 117 can be adjusted such that the equivalence ratio ($\phi$) changes by a fixed or substantially fixed amount per adjustment to the oxidant and/or fuel, e.g. about 0.001, about 0.01, or about 0.05. In another example, the amount of oxidant via line 112 and/or fuel via line 117 can be continuously altered such that the equivalence ratio continuously changes. Preferably the amount of oxidant via line 112 and/or fuel via line 117 is altered and combustion is carried out for a period of time sufficient to produce an exhaust gas of consistent or substantially consistent composition at which time the amount of oxidant and/or fuel can be adjusted to change the equivalence ratio ($\phi$) in an amount ranging form a low of about 0.00001, about 0.0001, or about 0.0005 to a high of about 0.001, about 0.01, or about 0.05. After the exhaust gas achieves a consistent or substantially consistent concentration of oxygen the oxidant via line 112 and/or fuel via line 117 can again be adjusted such that the equivalence ratio ($\phi$) again changes. The amount of oxygen and/or carbon monoxide in the exhaust gas in line 123 and/or the expanded exhaust gas in line 127 can be monitored and the amount of oxidant via line 112 and/or fuel via line 117 can be repeatedly adjusted until the exhaust gas has a combined concentration of oxygen and carbon monoxide of less than about 2 mol % or less than about 1.5 mol %, or less than about 1 mol %, for example.

The combustor 120 can be operated on a continuous basis such that the exhaust gas in line 123 has a combined oxygen and carbon monoxide concentration of less than 2 mol %, less than 1 mol %, less than 0.5 mol %, or less than about 0.1 mol %. In another example, the time during which combustion is carried out within the combustor 120, the exhaust gas in line 123 can have a combined oxygen and carbon monoxide concentration of less than 2 mol % or less than about 1 mol % for about 50%, 55%, 60%, 65%, 70%, 75%, 80%, 85%, 90%, or about 95% of the time during which the combustion and power generation system 100 is operated. In other words, for a majority of the time that combustion is carried out within the combustor 120, the exhaust gas in line 123 can have a combined oxygen and carbon monoxide concentration of less than about 2 mol %, less than about 1 mol %, less than about 0.5 mol %, or less than about 0.1 mol %.

The heat recovery unit 140 can indirectly transfer heat from the exhaust gas introduced via line 127 thereto to one or more heat transfer mediums introduced via line 138. Heat can be indirectly transferred or exchanged from the exhaust gas to the heat transfer medium to produce a heated heat transfer medium via line 142 and the cooled exhaust gas via line 143.

The cooled exhaust gas in line 143 can have a temperature ranging from a low of about 75° C. to a high of about 105° C. and a pressure ranging from a low of about atmospheric pressure to a high of about 120 kPa. For example, the pressure of the cooled exhaust gas in line 143 can range from about 101 kPa to about 110 kPa, about 102 kPa to about 107 kPa, or about 103 kPa to about 105 kPa.

Illustrative heat transfer mediums in line 138 can include, but are not limited to, water, air, steam, ethylene glycol, hydrocarbons, or any combination thereof. The heated heat transfer medium in line 142 can have a temperature ranging from about 75° C. to about 110° C. If the heat transfer medium is water, e.g. boiler feed water, steam or a mixture of water and steam can be produced via line 142. The heated heat transfer medium in line 142 can have a pressure ranging from a low of about 4,000 kPa to a high of about 15,000 kPa.

The heated heat transfer medium, e.g. steam, via line 142 can be introduced to the steam gas turbine 160 which can expand the heat transfer medium, thereby generating electrical power via the generator 165 coupled thereto and a heat transfer medium via line 162 having a reduced pressure relative to the heated heat transfer medium in line 142. The heat transfer medium in line 162 can be recycled to the heat recovery unit 140 via line 138, disposed of, and/or used in one or more other processes.

In one or more embodiments, at least a portion of the cooled exhaust gas in line 143 can be removed from the system 100 via line 145. The cooled exhaust gas removed from the system 100 via line 145 can be vented to the atmosphere, sent to a flare for at least partially combusting any residual fuel therein, introduced to an underground formation for storage and/or containment, or the like.

In one or more embodiments, at least a portion of the cooled exhaust gas in line 143 can be recycled via line 147 to the system 100. For example, of from about 20% to about 100% of the cooled exhaust gas in line 143 can be introduced via line 147 to the compressor 150 to provide a compressed exhaust gas via line 152. In another example, the amount of cooled exhaust gas in line 143 introduced via line 147 to the compressor 150 can range from a low of about 25%, about 40%, or about 50% to a high of about 60%, about 80%, about 90%, or about 100% to provide the compressed exhaust gas via line 152. In at least one specific embodiment, all of the cooled exhaust gas via line 147 can be introduced via line 147 to the compressor 150 to provide the compressed exhaust gas via line 152.

The compressed exhaust gas in line 152 can have a pressure ranging from a low of about 400 kPa to a high of about 4,500 kPa. The compressed exhaust gas in line 152 can have a temperature ranging from a low of about 300° C. to a high of about 430° C.

Although not shown, at least a portion of any water (gas, liquid, or a mixture thereof) contained in the cooled exhaust gas in line 147 can be removed before introduction to the compressor 150. The water can be removed using any suitable system, device, or combination of systems and/or devices. For example, at least a portion of any water in the cooled exhaust gas in line 147 can be removed by reducing the temperature of the cooled exhaust gas sufficiently such that water condenses thereby separating from the cooled exhaust gas. In another example, at least a portion of any water in the cooled exhaust gas in line 147 can be removed via an adsorption or absorption process.

Any amount of the compressed exhaust gas in line 152 can be introduced to the combustor 120 via line 154 as a diluent. Similarly, any amount of the compressed exhaust gas in line 152 can be removed via line 155 from the system 100. For example, the amount of the compressed exhaust gas or "diluent" via line 154 that is introduced to the combustor 120 can range from about 10% to about 100% of the compressed exhaust gas in line 152. In another example, the amount of compressed exhaust gas via line 154 introduced to the combustor 120 can range from a low of about 20%, about 30%, or about 40% to a high of about 50%, about 60%, or about 70% of the compressed exhaust gas in line 152. In at least one example, the amount of compressed exhaust gas via line 154 introduced to the combustor 120 can range from about 50% to about 70% and the amount of compressed exhaust gas via line 155 removed from the system 100 can range from about 30% to about 50% of the compressed exhaust gas in line 152. In at least one other example, all the compressed exhaust gas via line 154 can introduced to the combustor 120 and excess compressed exhaust gas can be removed from the combustor.

Accordingly, the amount of cooled exhaust gas in line 143 ultimately introduced as the compressed exhaust gas via line 154 to the combustor 120 can range from a low of about 10% to about 100%. For example, the amount of cooled exhaust gas in line 143 ultimately introduced as the compressed exhaust gas via line 154 to the combustor 120 can range from a low of about 40%, about 45%, about 50%, or about 55% to a high of about 65%, about 70%, about 80%, or about 90% and the amount of cooled exhaust gas in line 143 ultimately removed via line 155 from the system 100 ranges from about 1% to about 60%. In another example, the amount of cooled exhaust gas in line 143 ultimately introduced as the compressed exhaust gas via line 154 to the combustor 120 can range from about 55% to about 65% and the amount of cooled exhaust gas in line 143 ultimately removed via line 155 from the system 100 can range from about 35% to about 45%.

Depending, at least in part, on the particular oxidant in line 112, the particular fuel in line 117, and/or the amount of compressed exhaust gas via line 154 introduced to the combustor 120, the exhaust gas in line 123 can have a carbon dioxide concentration ranging from a low of about 6 mol %, about 8 mol %, about 10 mol %, about 12 mol %, or about 14 mol % to a high of about 20 mol %, about 24 mol %, about 28 mol %, about 32 mol %, or about 34 mol %. The exhaust gas in line 123 can have a water and/or steam concentration ranging from a low of about 19 mol %, about 25 mol %, about 30 mol %, or about 35 mol % to a high of about 50 mol %, about 60 mol %, about 65 mol %, or about 70 mol %. The exhaust gas in line 123 can have a carbon monoxide concentration of less than about 2 mol %, less than about 1.5 mol %, less than 1 mol %, less than 0.5 mol %, less than about 0.1 mol %, or less than about 0.05 mol %. The exhaust gas in line 123 can have an oxygen concentration of less than about 2 mol %, less than about 1.5 mol %, less than 1 mol %, less than 0.5 mol %, less than about 0.1 mol %, or less than about 0.05 mol %. The exhaust gas in line 123 can have a nitrogen concentration ranging from a low of about 0.01 mol %, about 1 mol %, or about 5 mol % to a high of about 60 mol %, about 70 mol %, or about 75 mol %. The exhaust gas in line 123 can have a nitrogen oxide(s) concentration of from about 0.0001 mol % to about 0.1 mol %. The exhaust gas in line 123 can have an argon concentration of from about 0.1 mol % to about 1.5 mol %.

In one or more embodiments, a weight ratio between the fuel and the compressed exhaust gas introduced to the combustor 120 can range from a low of about 0.027:1 to a high of about 0.061: depending if the oxidant is oxygen or air. In one or more embodiments, a weight ratio between the oxidant and the compressed exhaust gas introduced to the combustor 120 can range from a low of about 0.101:1 to a high of about 0.9555:1.

In one or more embodiments, the compressed exhaust gas via line 154 can be mixed with the oxidant in line 112, the fuel in line 117, introduced directly to the combustor 120, or any combination thereof. For example, all or a portion of the compressed exhaust in line 154 can be mixed with the oxidant in line 112 to provide an oxidant/exhaust gas mixture that can then be mixed with the fuel. In at least one specific embodiment, a first portion of the compressed exhaust gas in line 154 can be mixed with the oxidant in line 112 and a second portion of the compressed exhaust gas in line 154 can be introduced directly to the combustor 120, mixed with the fuel in line 117, or both. In at least one other specific embodiment, a first portion of the compressed exhaust gas in line 154 can be mixed with the oxidant in line 112 or with the oxidant within the combustor 120 and a second portion of the compressed exhaust gas in line 154 can be introduced to the combustor and mixed with the exhaust gas within the combustor 120.

The oxidant via line 101 introduced to the compressor 105 can be or include any suitable oxygen containing material or combination of materials. Illustrative oxidants can include, but are not limited to, air, oxygen ($O_2$), essentially oxygen, oxygen-enriched air, oxygen-lean air, hydrogen peroxide ($H_2O_2$), ozone ($O_3$), a mixture of oxygen and one or more gases such as air, water, carbon dioxide, nitrogen, and/or argon, or any combination thereof. The oxidant in line 101 can contain from about 1 vol % to about 100 vol % oxygen. As used herein, the term "essentially oxygen" refers to an oxidant containing more than 50 vol % oxygen. For example, an essentially oxygen fluid could contain from about 55 vol % to about 100 vol % oxygen. As used herein, the term "oxygen-enriched air" refers to an oxidant containing more than about 21 vol % oxygen and up to 50 vol % oxygen. As used herein, the term "oxygen-rich" refers to both oxygen-enriched air and essentially oxygen. As used herein, the term "oxygen-lean air" refers to an oxidant containing less than about 20 vol % oxygen. The oxidant in line 101 can be nitrogen-free or essentially nitrogen-free. As used herein, the term "essentially nitrogen-free" refers to an oxidant in line 101 containing about 5 vol % nitrogen or less, 4 vol % nitrogen or less, 3 vol % nitrogen or less, 2 vol % nitrogen or less, or 1 vol % nitrogen or less.

The oxidant flow meter 110 can be any suitable device, system, or combination of devices and/or systems adapted or configured to control the amount of oxidant introduced to the combustor 120. Illustrative flow control devices can include, but are not limited to, valves, compressors, nozzles, pumps, and the like.

The fuel in line 114 can be or include any combustible material or combination of combustible materials. The fuel in line 114 can include one or more gaseous hydrocarbons, liquid hydrocarbons, solid hydrocarbons, or a mixture of gaseous, liquid, and/or solid hydrocarbons. Illustrative hydrocarbons can include, but are not limited to, $C_1$ to $C_{20}$ hydrocarbons or any combination thereof. For example, the fuel in line 114 can include methane, ethane, ethylene, acetylene, propane, propylene, methylacetylene, cyclopropane, propadiene, butane, butylene, butyne, cyclobutane, butadiene, pentane, pentene, pentyne, cyclopentane, pentadiene, hexane, hexene, hexyne, cyclohexane, hexadiene, heptane, heptene, heptyne, cycloheptane, heptadiene, octane, octene, octyne, cyclooctane, octadiene, nonane, nonene, nonyne, cyclononane, nonadiene, decane, decene, decyne, cyclodecane, decadiene, mixtures thereof, or any combination thereof. Another suitable fuel can include hydrogen. Hydrogen can be used alone can be combined with any one or more other fuels, e.g. one or more $C_1$ to $C_{10}$ hydrocarbons.

In one or more embodiments, the fuel in line 114 can have a methane concentration ranging from a low of about 10 mol %, about 30 mol %, about 50 mol %, or about 75 mol % to a high of about 95 mol %, about 99 mol %, or about 99.9 mol % with the balance including hydrogen, $C_2$, $C_3$, $C_4$, and heavier hydrocarbons, or any combination thereof. For example, the fuel in line 114 can have a methane concentration of about 80 mol % or more, about 90 mol % or more, about 97 mol % or more, about 98 mol % or more, or about 99.5 mol % or more. The hydrogen concentration in the fuel in line 114 can range from a low of about 0.1 mol %, about 1 mol %, or about 5 mol % to a high of about 20 mol %, about 30 mol %, or about 35 mol %. In another example, the fuel in line 114 can be or include natural gas. If the fuel in line 114 includes natural gas, the natural gas can be derived from associated gas (i.e. recovered from an oil well), non-associated gas (i.e. isolated in a natural gas field), biogas (e.g., methane containing gas produced form a landfill), hydrates, or any combination thereof. Natural gas can be used directly from its source and/or can be pre-purified or pre-treated to remove at least a portion of one or more contaminants such as hydrogen sulfide ($H_2S$), water, sand, carbon dioxide, and the like.

The fuel flow meter 115 can include any device, system, or combination of devices and/or systems capable of measuring, determining, or otherwise estimating an amount of fuel introduced thereto via 114. Illustrative fuel flow meters 115 can include, but are not limited to, valves, pumps, nozzles, turbine meters, venturi flow meters, orifice plates, or any combination thereof.

The combustor 120 can include one or more burners, combustion zones, combustion liners, mixing zones, and related equipment. The combustor can be combined with a transition piece and other features when integrated into a system, for example, a gas turbine system.

The expander 125 can include one or more nozzles that can direct the exhaust gas in line 123 to a turbine. The exhaust gas introduced to the turbine can cause the turbine to spin thereby generating mechanical power. The mechanical power generated via the expander 125 can be used to drive the compressor 150 via shaft 126. In another example, all or a portion of the power generated via the expander 125 can be used to power the electrical generator 170. In still another example, a first portion of the power generated via the expander 125 can be used to drive the compressor 150 and a second portion can be used to drive the electrical generator 170.

The compressors 105, 150 can include any type of compressor. Illustrative compressors can include, but are not limited to, axial, centrifugal, rotary positive displacement, and the like. In one or more embodiments, the compressor 105 can be a different type of compressor than the compressor 150. In one or more embodiments, the compressors 105 and 150 can be of the same type of compressor, e.g., axial compressors.

Each combustor 120, expander 125, and compressor 150 can be integrated with one another to provide an integrated gas turbine or combustion turbine system 180. In another example, the combustor 120, expander 125, and/or compressor 150 can be individual components. For example, the combustor 120 can be a stand alone unit such as a furnace. The expander 125 and compressor 150 can also be stand alone units or can be coupled to one another via the shaft 126 or other mechanical, electrical, or other power coupling, thereby allowing at least a portion of the mechanical energy generated by the expander 125 to drive the compressor 150.

The heat recovery unit 140 can include any system, device, or combination of systems and/or devices capable of indirectly exchanging heat between the expanded exhaust gas introduced via line 127 and the heat transfer medium introduced via line 138 thereto. Illustrative heat recovery units 140 can be or include, but are not limited to, shell-and-tube exchangers, plated and frame exchangers, U-tube exchangers, spiral wound exchangers, fin-fan exchangers, or any combination thereof. In another example, the heat recovery unit 140 can be or include an expanded exhaust gas duct or channel through which the exhaust gas introduced via line 127 flows through with one or more coils disposed therein such that the expanded exhaust gas flows across the one or more coils. In one or more embodiments, any, component of the heat recovery unit 140 can include surface enhanced tubes (e g , fins, static mixers, rifling, heat conductive packing, turbulence causing projections, or any combination thereof), and the like.

The steam turbine 160 can include one or more nozzles that can direct the heated heat transfer medium in line 142 to the steam turbine. The heated heat transfer medium introduced to the steam turbine 160 can cause the turbine to spin thereby generating mechanical power. The mechanical power generated via the steam turbine 160 can be used to drive the electrical generator 165. Although not shown, the mechanical power generated via the steam turbine 160 can be used to drive the compressor 105, compressor 150, electrical generator 170, electrical generator 165, or any combination thereof.

The electrical generators 165, 170 can include any device, system, or combination of devices and/or systems capable of converting mechanical energy into electrical energy. Illustrative electrical generators 165, 170 can be, but are not limited to, synchronous and induction type generators.

Figure 3:
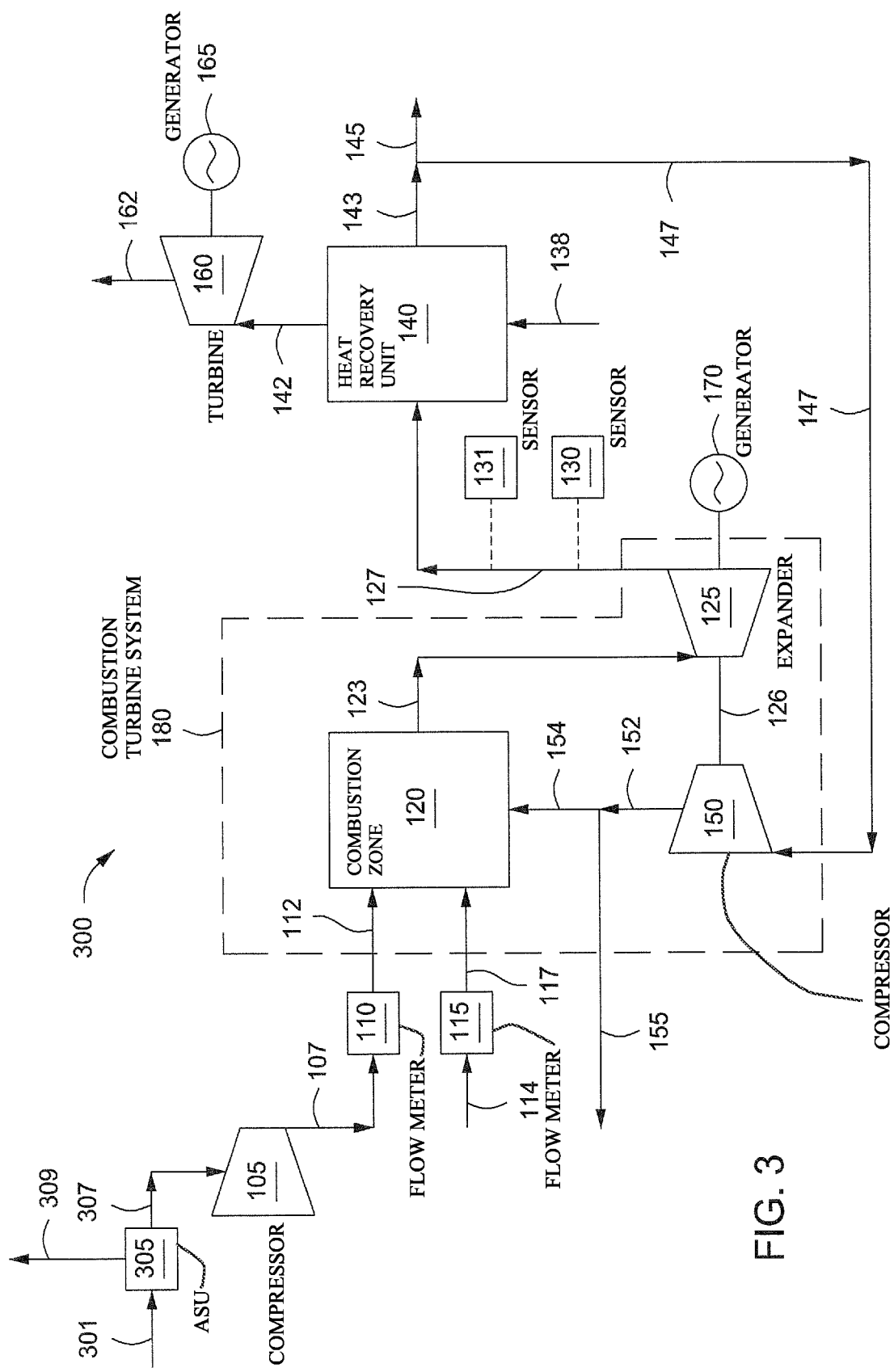
FIG. 3 depicts a schematic of an illustrative combustion and power generation system for controlling the composition of an exhaust gas produced from combusting a fuel and an oxygen-rich fluid and producing mechanical power, according to one or more embodiments described.

FIG. 3 depicts a schematic of another illustrative combustion and power generation system 300 for controlling the composition of an exhaust gas produced from combusting a fuel and an oxygen-rich fluid and producing mechanical power, according to one or more embodiments. The combustion and power generation system 300 can be similar to the system 100 discussed and described above with reference to FIG. 1. The system 300 can further include one or more air separation units ("ASU") (one is shown) 305. Air via line 301 can be introduced to the air separation unit 305 which can at least partially separate oxygen from the air to provide an oxygen-enriched air or essentially oxygen fluid via line 307 and an oxygen-lean air via line 309.

In at least one specific embodiment, the air separation unit 305 can provide an oxygen-enriched fluid via line 307. In at least one other specific embodiment, the air separation unit 305 can provide an essentially-oxygen fluid via line 307. As such, the amount of oxygen in line 307 can be greater than 21 vol % oxygen and up to about 100 vol % oxygen. The oxygen-rich fluid via line 307 can be obtained, for example, from cryogenic distillation of air, pressure swing adsorption, membrane separation, or any combination thereof.

If the compressed oxidant in line 107 is oxygen-enriched air the exhaust gas via line 123 can have a carbon dioxide concentration of from about 10 mol % to about 34 mol %, a water and/or steam concentration of from about 15 mol % to about 60 mol %, a carbon monoxide concentration of from about 0.01 mol % to about 2 mol %, an oxygen concentration of from about 0.001 mol % to about 2 mol %, a fuel concentration of from about 0.001 mol % to about 0.1 mol %, a nitrogen concentration of from about 0.01 mol % to about 70 mol %, a nitrogen oxide concentration of from about 0.01 mol % to about 0.03 mol %, and/or an argon concentration of from about 0.2 mol % to about 0.9 mol %. If the compressed oxidant in line 107 is essentially oxygen, the exhaust gas via line 123 can have a carbon dioxide concentration of from about 30 mol % to about 35 mol %, a water and/or steam concentration of from about 60 mol % to about 70 mol %, a carbon monoxide concentration of from about 0.01 mol % to about 2 mol %, an oxygen concentration of from about 0.001 mol % to about 2 mol %, a fuel concentration of from about 0.001 mol % to about 0.1 mol %, a nitrogen concentration of from about 0.01 mol % to about 1.5 mol %, a nitrogen oxide concentration of from about 0.001 mol % to about 0.03 mol %, and/or an argon concentration of from about 0.2 mol % to about 1.5 mol %.

Figure 4:
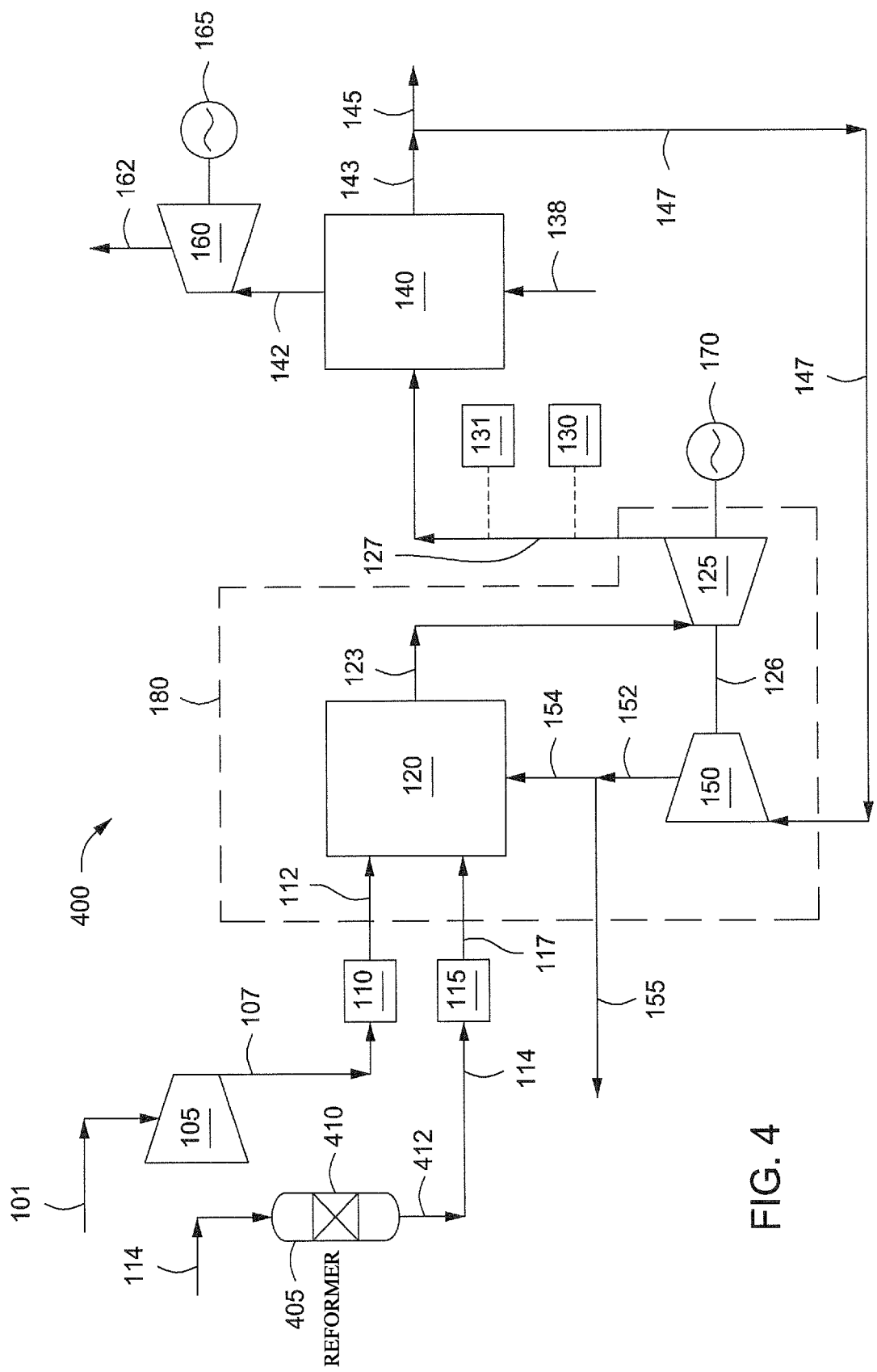
FIG. 4 depicts a schematic of an illustrative combustion and power generation system for reforming a fuel, controlling the composition of an exhaust gas produced by combusting the fuel, and producing power therefrom, according to one or more embodiments described.

FIG. 4 depicts a schematic of an illustrative combustion and power generation system 400 for reforming a fuel, controlling the composition of an exhaust gas produced by combusting the fuel, and producing power therefrom, according to one or more embodiments. The combustion and power generation system 400 can be similar to the systems 100 and/or 300 discussed and described above with reference to FIGS. 1 and 3. The system 400 can further include one or more reformers (one is shown) 405. The reformer 405 can at least partially reform, treat, purify, filter, or otherwise modify or alter the composition of the fuel in line 114 to produce a reformed fuel via line 412.

The reformed fuel via line 412 can contain less of one or more impurities or undesired components than the fuel in line 114. Illustrative impurities can include, but are not limited to, hydrogen sulfide, carbon monoxide, hydrocarbons containing greater than one carbon atom, e.g., $C_2$-$C_{20}$ hydrocarbons, or any combination thereof.

The reformer 305 can modify or alter the composition of the fuel in line 114 using any type of process or combination of processes. As shown, the reformer 405 can include one or more catalyst-containing beds 410 that can catalytically react one or more impurities contained in the fuel in line 114 to a more beneficial or more desirable component(s).

For example, the fuel via line 114 can be recovered from a hydrocarbon containing formation, which is commonly referred to as "breakthrough gas." The majority of the larger hydrocarbons in the breakthrough gas can be separated therefrom, but some minor amounts of hydrocarbons, e.g., $C_2$, $C_3$, and $C_4$ hydrocarbons, can still be contained in fuel in line 114. At least a portion of the carbon-carbon bonds in these larger hydrocarbons can be broken via the reformer 405, thereby reducing the amount of the larger hydrocarbons. Reducing the amount of $C_2$ and larger hydrocarbons in the fuel in line 114 can reduce the amount of soot produced in the combustor 120 and/or the potential for soot to be produced in the combustor. Additionally, reducing the amount of $C_2$ and larger hydrocarbons can also produce some hydrogen, which can improve the combustion of the fuel within the combustor 120. Another benefit of the hydrogen that can be produced can be that the blow out temperature of the combustion process is reduced, thereby allowing reduced flame temperatures within the combustor 120. Reducing the flame temperature within the combustor 120 can also increase the efficiency of the system 400.

Illustrative catalysts that can be used in the catalyst-containing bed 410 can include, but are not limited to, nickel, platinum, rhodium, ruthenium, palladium, derivatives thereof, or any combination thereof. The catalyst containing bed 410 can be a fixed bed, a fluidized or moving bed, or a combination thereof.

Other illustrative processes suitable for use in the reformer 405 can include, but are not limited to, solvent extraction processes, liquid-liquid extraction processes, distillation, fractionation, membrane filters, stripping, adsorption processes, absorption processes, or any combination thereof.

Figure 5:
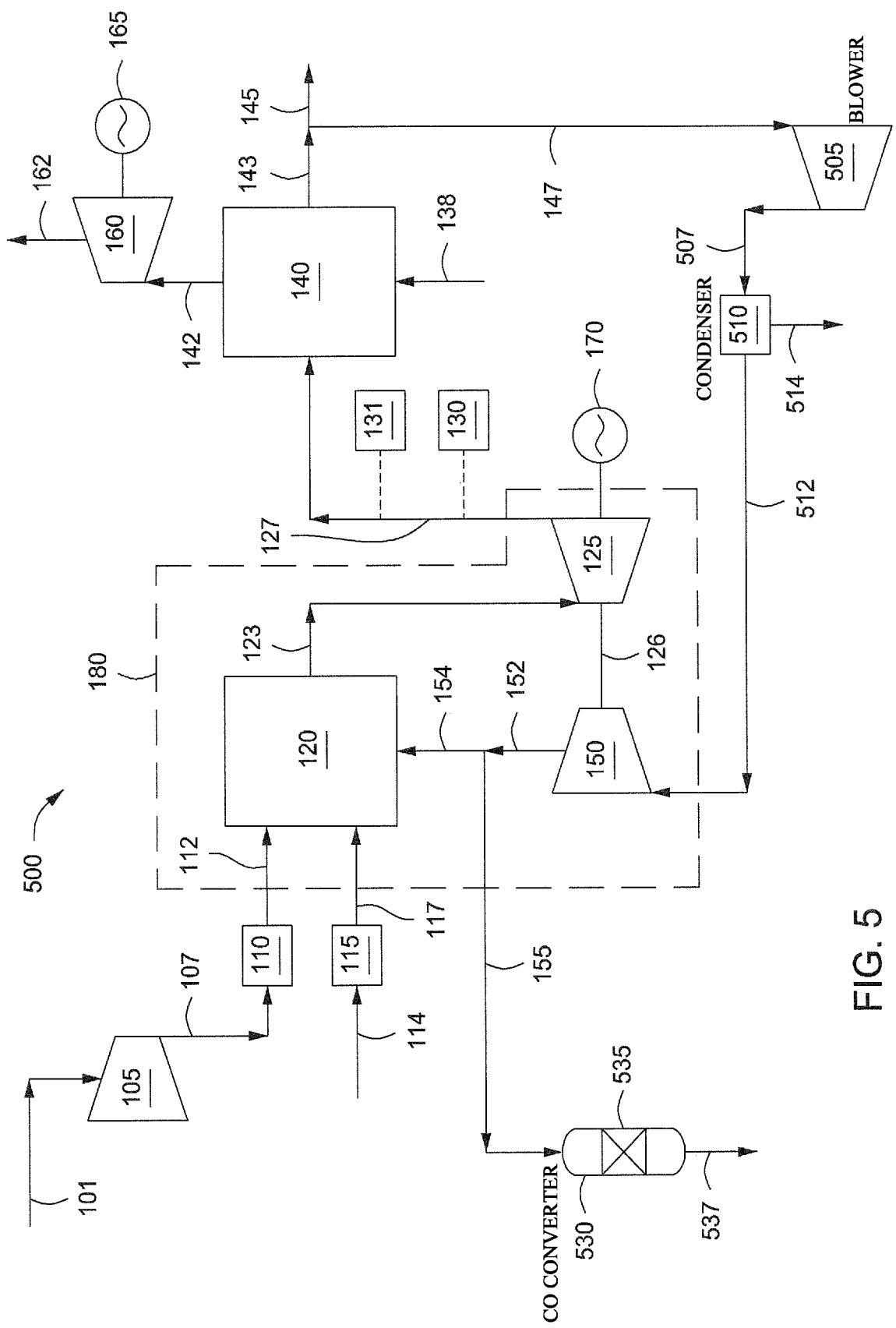
FIG. 5 depicts a schematic of an illustrative combustion and power generation system for combusting a fuel and an oxidant to produce an inert gas, according to one or more embodiments described.

FIG. 5 depicts a schematic of an illustrative combustion and power generation system 500 for combusting a fuel and an oxidant to produce an inert gas, according to one or more embodiments. The combustion and power generation system 400 can be similar to the systems 100, 300, and/or 400, as discussed and described above with reference to FIGS. 1, 3, and 4. The combustion and power generation system 500 can further include one or more blowers (one is shown) 505, condensers (one is shown) 510, and carbon monoxide converters (one is shown) 530.

In one or more embodiments, the cooled exhaust gas via line 147 can be introduced to the blower 505 to produce a cooled exhaust gas via line 507 having an increased pressure relative to the exhaust gas in line 147. As discussed and described above with reference to FIG. 1, the exhaust gas in line 147 can have a pressure ranging from about atmospheric pressure up to about 110 kPa. In one or more embodiments, the exhaust gas in line 507 can have a pressure ranging from a low of about 110 kPa, about 113 kPa, or about 115 kPa to a high of about 120 kPa, about 140 kPa, or about 150 kPa.

The cooled exhaust gas via line 507 can be introduced to the condenser 510 to provide a saturated exhaust gas via line 512 and condensed water via line 514. The saturated exhaust gas in line 512 can have a concentration of water ranging from a low of about 5 mol % to a high of about 20 mol %. The particular concentration of water in the saturated exhaust gas in line 512 can depend, at least in part, on the particular temperature and/or pressure of the saturated exhaust gas. The condensed water via line 514 can be disposed of, introduced to the heat recovery unit 140 via line 138, used in one or more other processes, or any combination thereof, for example. Although not shown, the cooled exhaust gas via line 147 can be introduced to the condenser 510 before being introduced to the blower 505.

The saturated exhaust gas via line 512 can be introduced to the compressor 150, compressed, and recovered via line 152 as the compressed exhaust gas. At least a portion of the saturated exhaust gas via line 154 can be introduced to the combustor 120 and/or removed via line 155 from the combustion and power generation system 500. In at least one specific embodiment a first portion of the compressed saturated exhaust gas via line 154 is introduced to the combustor 120 and a second portion of the compressed exhaust gas via line 155 is introduced to the carbon monoxide converter 530.

At least a portion of the carbon monoxide in the compressed exhaust gas in line 155 can be converted to carbon dioxide within the carbon monoxide converter 530 to provide an exhaust gas or "inert gas" via line 537 having a reduced concentration of carbon monoxide relative to the compressed exhaust gas in line 155. The inert gas via line 537, on a dry basis, can have a carbon monoxide concentration of less than about 500 ppm, less than about 100 ppm, less than about 50 ppm, less than about 20 ppm, less than about 10 ppm, less than about 5 ppm, less than about 1 ppm, less than about 0.5 ppm, or less than about 0.01 ppm. The inert gas in line 537 can include water and/or water vapor. At least a portion of any water and/or water vapor contained in the inert gas in line 537 can be removed to produce an inert gas having less water and/or water vapor than the inert gas in line 537.

In one or more embodiments, the oxidant via line 112 and the fuel via line 117 can be at least partially combusted within the combustor 120 to produce an exhaust gas via line 123 containing less than about 10 ppm oxygen, less than about 5 ppm oxygen, less than about 3 ppm oxygen, less than about 1 ppm oxygen, less than about 0.1 ppm oxygen, or less than about 0.01 ppm oxygen. As such, the exhaust gas via line 537 can contain less than about 10 ppm oxygen and less than about 10 ppm carbon monoxide. In another example, the exhaust gas via line 537 can contain less than about 1 ppm oxygen and less than about 1 ppm carbon monoxide. Accordingly, the combustion and power generation system 500 can produce an exhaust gas via line 537 that can be referred to as an "inert gas" that contains primarily carbon dioxide, nitrogen, or both, depending on the particular oxygen concentration in the oxidant in line 101. For example, if the oxidant is air, the inert gas in line 537 can contain from about 11 mol % to about 12 mol % carbon dioxide and from about 85 mol % to about 88 mol % nitrogen (on a dry basis). In another example, if the oxidant in line 101 contains pure oxygen, e.g. greater than about 95 mol % oxygen or greater than about 99 mol % oxygen, the inert gas in line 537 can contain from about 98 mol % to about 99.5 mol % carbon dioxide and from about 0.01 mol % to about 0.05 mol % nitrogen (on a dry basis).

In one or more embodiments, the blower 505 can include any device, system, or combination of systems and/or devices capable of increasing the pressure of the cooled exhaust gas in line 147. For example, the blower 505 can be or include one or more fan. Other illustrative blowers 505 can include, but are not limited to, axial, centrifugal, or any combination thereof.

In one or more embodiments, the condenser 510 can include a cooler in which the temperature of the exhaust gas is reduced, thereby causing at least a portion of any water vapor to condense out. Other suitable condensers 510 can include, but are not limited to, direct contact coolers, heat exchangers, or any combination thereof.

In one or more embodiments, the carbon monoxide converter 530 can include one or more conversion systems, devices, processes, or any combination thereof. As shown, the carbon monoxide converter 530 can include one or more catalyst containing beds 535. Illustrative catalysts can include, but are not limited to, platinum, rhodium, palladium, ruthenium, nickel, oxides thereof, derivatives thereof, or any combination thereof.

In one or more embodiments, the carbon monoxide converter 530 can convert one or more other compounds in addition to or in lieu of carbon monoxide. For example, the carbon monoxide converter 530 can convert at least a portion of any nitrogen oxides in the compressed exhaust gas in line 155 to nitrogen and oxygen. In another example, the carbon monoxide converter 530 can convert at least a portion of any fuel in the compressed exhaust gas in line 155 to carbon dioxide and water or steam. In still another example, the carbon monoxide converter 530 can convert a least a portion of two or more of any carbon monoxide, fuel, and nitrogen oxide in the compressed exhaust gas in line 155 to carbon dioxide, carbon dioxide and water or steam, and nitrogen and oxygen, respectively.

Figure 6:
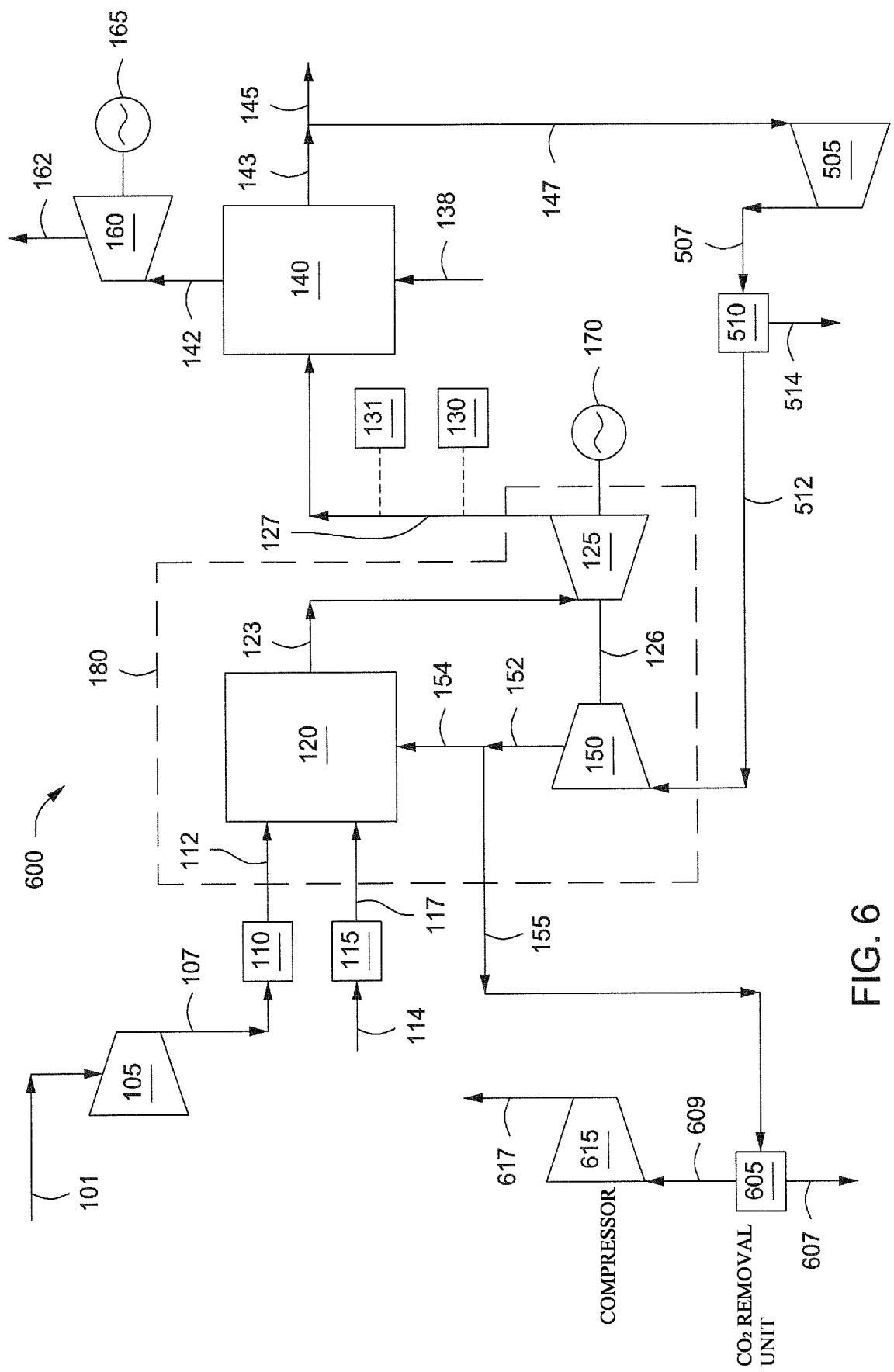
FIG. 6 depicts a schematic of an illustrative combustion and power generation system for combusting a fuel and an oxidant to produce a compressed inert gas, according to one or more embodiments described.

FIG. 6 depicts a schematic of an illustrative combustion and power generation system 600 for combusting a fuel and an oxidant to produce a compressed inert gas, according to one or more embodiments. The combustion and power generation system 600 can be similar to the systems 100, 300, 400, and/or 500, discussed and described above with reference to FIGS. 1, and 3-5. The combustion and power generation system 600 can further include one or more carbon dioxide removal units (one is shown) 605 and compressors (one is shown) 615.

In one or more embodiments, at least a portion of the compressed exhaust gas via line 155 can be introduced to the carbon dioxide removal unit 605 to produce a carbon dioxide rich gas via line 607 and a carbon dioxide lean gas via line 609. In other words, the carbon dioxide concentration in the carbon dioxide rich gas via line 607 can be greater than in the compressed exhaust gas in line 155. Similarly, the carbon dioxide concentration in the carbon dioxide lean gas via line 609 can be less than in the compressed exhaust gas in line 155.

The carbon dioxide rich gas via line 607 can have a carbon dioxide concentration of about 95 mol % or more, about 97 mol % or more, or about 99 mol %, or about 99.9 mol %, for example. The carbon dioxide lean gas via line 609 can have a carbon dioxide concentration of less than about 5 mol %, less than about 3 mol %, less than about 1 mol %, less than about 0.5 mol %, or less than about 0.1 mol %.

The carbon dioxide rich gas in line 607 can be used for any number of applications or processes and/or disposed of. For example, the carbon dioxide rich gas in line 607 can be sold as an end product, used for one or more processes or applications such as enhanced oil recovery operations, pneumatic systems, fire extinguishing systems, welding systems, caffeine removal processes, lasers, refrigeration systems, or any combination thereof. In another example, the carbon dioxide rich gas via line 607 can be introduced to one or more storage containment systems for sequestration. Illustrative storage containment systems for sequestration can include, but are not limited to, underground formations, man-made containment vessels, or both.

The carbon dioxide lean gas in line 609 can be used for any number of applications or processes and/or disposed of. For example, the carbon dioxide lean gas in line 609 can be vented to the atmosphere. In another example, the carbon dioxide lean gas in line 609 can be liquefied and used as a cooling medium. In still another example, the carbon dioxide lean gas in line 609 can be further processed into one or more products, e.g. ammonia and/or urea. In yet another example, the carbon dioxide lean gas in line 609 can be used as an inert gas for drying applications, e.g., the drying of conduits carrying one or more communication wires or cables.

In one or more embodiments, the carbon dioxide lean gas via line 609 can be introduced to the compressor 615 to produce a second compressed exhaust gas via line 617. The second compressed exhaust gas in line 617 can be used in one or more pressure maintenance applications. In another example, the second compressed exhaust gas in line 617 can be used in one or more for pressure maintenance on a hydrocarbon reservoir.

The carbon dioxide removal unit 605 can include any one or a combination of physical, mechanical, electrical and/or chemical systems configured in series, parallel, or any combination thereof. In one or more embodiments, the carbon dioxide removal unit 605 can include one or more physical separation systems including, but not limited to, membrane type systems and/or solvent based systems. For example, the carbon dioxide removal unit 605 can include, but is not limited to, absorption/desorption type, solvent-based systems. The carbon dioxide removal unit 605 can contact the compressed exhaust gas introduced via line 155 with one or more absorbents to remove at least a portion of the carbon dioxide. Carbon dioxide selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), derivatives thereof, mixtures thereof, or any combination thereof. Other suitable adsorbents and techniques can include, but are not limited to, potassium carbonate, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

The compressor 615 can be similar to the compressors 105 and 150 discussed and described above with reference to FIG. 1.

Figure 7:
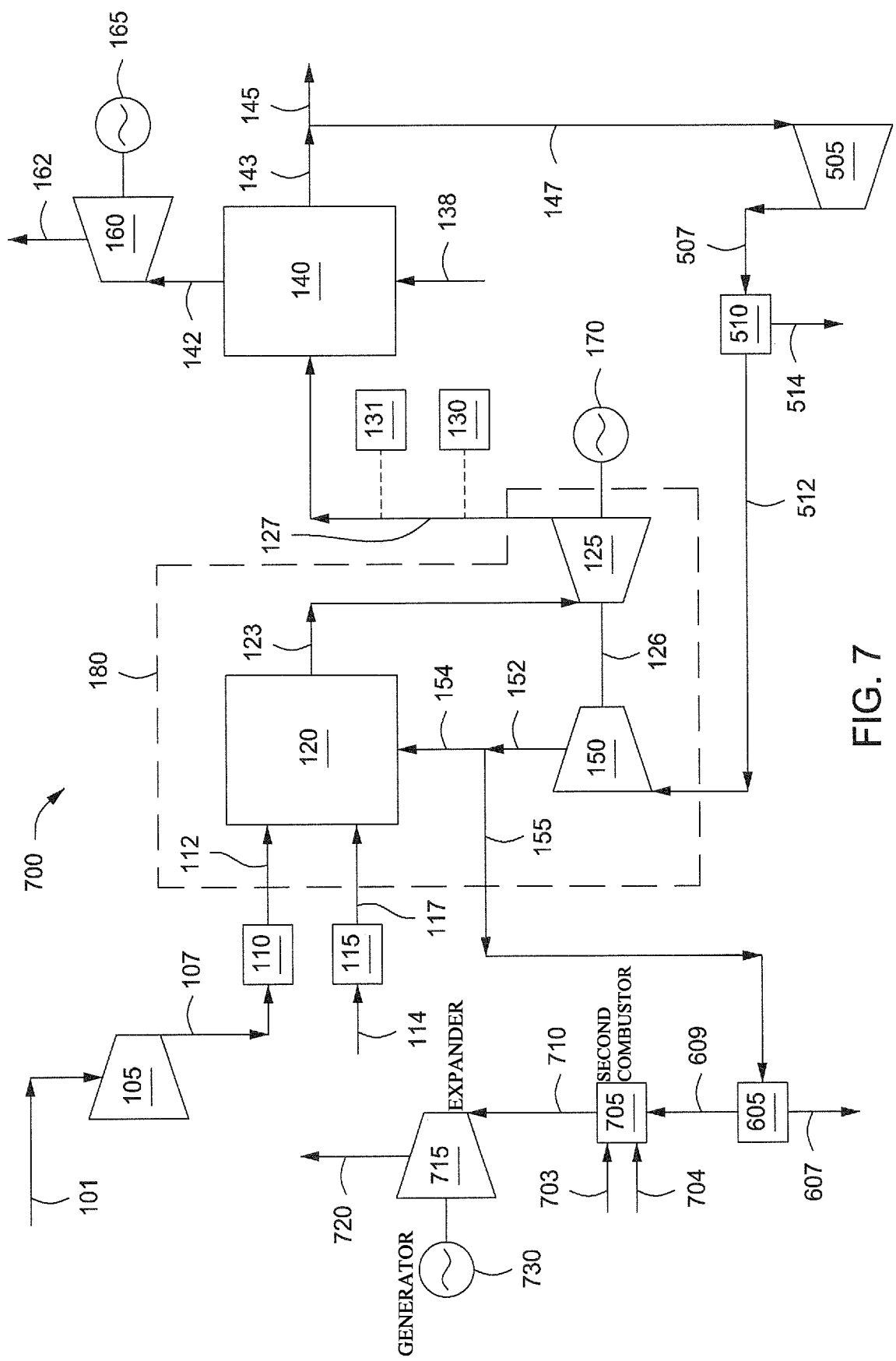
FIG. 7 depicts a schematic of an illustrative combustion and power generation system for generating power, carbon dioxide, and an expanded inert gas, according to one or more embodiments described.

FIG. 7 depicts a schematic of an illustrative combustion and power generation system 700 for generating power, carbon dioxide, and an expanded inert gas, according to one or more embodiments. The combustion and power generation system 700 can be similar to the systems 100, 300, 400, 500, and/or 600, discussed and described above with reference to FIGS. 1, and 3-6. The combustion and power generation system 700 can further include one or more second combustors (one is shown) 705, second expanders (one is shown) 715, and generators (one is shown) 730.

The carbon dioxide lean gas via line 609 can be introduced to the second combustor 705. An oxidant via line 703 and/or a fuel via line 704 can also be introduced to the second combustor 705. At least a portion of any combustible material in the carbon dioxide lean gas via line 609 and/or the fuel via line 704 introduced to the combustor 705 can be combusted within the second combustor 710 to produce a second exhaust gas via line 710 having a reduced concentration of combustible material relative to the carbon dioxide lean gas in line 609. For example, as discussed above with reference to FIG. 6, the saturated exhaust gas in line 512 can have a fuel concentration ranging from a low of about 0.001 mol % to a high of about 0.1 mol %. As such, the compressed exhaust gas in line 155 can have a fuel concentration ranging from a low of about 0.001 mol % to a high of about 0.1 mol %. The additional of supplemental fuel introduced via line 704 can be adjusted such that the exhaust gas via line 710 has a lower concentration of fuel relative to the carbon dioxide lean gas in line 609.

The second exhaust gas in line 710 can have a carbon dioxide concentration of from about 2 mol % to about 8 mol %, a water and/or steam concentration of from about 8 mol % to about 16 mol %, a carbon monoxide concentration of from about 0.01 mol % to about 1 mol %, an oxygen concentration of from about 0.1 mol % to about 1 mol %, a nitrogen concentration of from about 70 mol % to about 85 mol %, a nitrogen oxide(s) concentration of from about 0.1 mol % to about 0.3 mol %, and/or an argon concentration of from about 0.1 mol % to about 1.5 mol %. In one or more embodiments, the second exhaust gas in line 710 can contain less than about 2 mol %, less than about 1 mol %, less than about 0.5 mol %, or less than about 0.1 mol % carbon monoxide. In one or more embodiments, the second exhaust gas in line 710 can contain less than about 2 mol %, less than about 1 mol %, less than about 0.8 mol %, or less than about 0.5 mol % oxygen. In one or more embodiments, the second exhaust gas in line 710 can contain less than about 1 mol %, less than about 0.5 mol %, or less than about 0.1 mol % nitrogen oxides.

The second exhaust gas via line 710 can have a temperature ranging from about 1,100° C. to about 1,500° C. and a pressure ranging from about 1,200 kPa to about 4,500 kPa.

The second exhaust gas via line 710 can be introduced to the expander 715 to produce a second expanded exhaust gas via line 720. The expanded exhaust gas via line 720 can have a temperature ranging from about 690° C. to about 725° C. and a pressure of from about 101 kPa to about 110 kPa. At least a portion of the mechanical power produced from expanding the second exhaust gas in line 710 can be converted into energy, e.g., electricity via the electrical generator 730, used to drive the one or more compressors 105 and/or 150, and/or other work. The expanded gas via line 720 can be vented to the atmosphere, liquefied used in one or more refrigeration processes, or any combination thereof.

Figure 8:
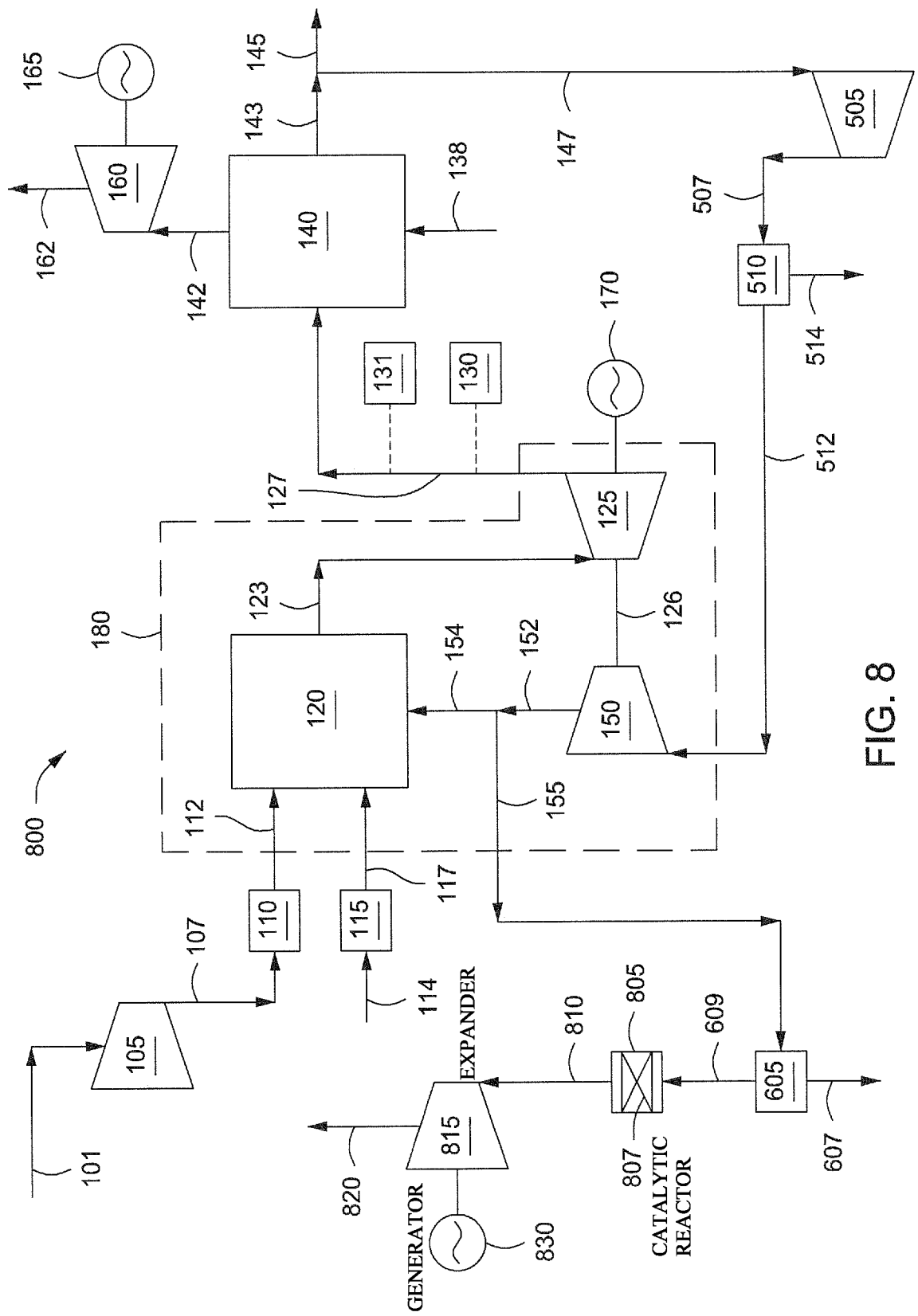
FIG. 8 depicts another schematic of an illustrative combustion and power generation system for generating power, carbon dioxide, and an expanded inert gas, according to one or more embodiments described.

FIG. 8 depicts another schematic of an illustrative combustion and power generation system 800 for generating power, carbon dioxide, and an expanded inert gas, according to one or more embodiments. The combustion and power generation system 800 can be similar to the systems 100, 300, 400, 500, and/or 600, discussed and described above with reference to FIGS. 1, and 3-6. The combustion and power generation system 800 can further include one or more catalytic reactors (one is shown) 805, second expanders (one is shown) 815, and generators (one is shown) 830.

The carbon dioxide lean gas via line 609 can be introduced to the catalytic reactor 805. At least a portion of any combustible material in the carbon dioxide lean gas via line 609 can be catalytically reacted within the catalytic reactor 805 to produce a second exhaust gas via line 810 having a reduced concentration of combustible material relative to the carbon dioxide lean gas in line 609. For example, as discussed above with reference to FIG. 6, the saturated exhaust gas in line 512 can have a fuel concentration ranging from a low of about 0.001 mol % to a high of about 0.1 mol %. As such, the compressed exhaust gas in line 155 can have a fuel concentration ranging from a low of about 0.001 mol % to a high of about 0.1 mol %.

The second exhaust gas in line 810 can have a carbon dioxide concentration of from about 2 mol % to about 8 mol %, a water and/or steam concentration of from about 8 mol % to about 16 mol %, a carbon monoxide concentration of from about 0.01 mol % to about 1 mol %, an oxygen concentration of from about 0.1 mol % to about 1 mol %, a nitrogen concentration of from about 70 mol % to about 85 mol %, a nitrogen oxide(s) concentration of from about 0.1 mol % to about 0.3 mol %, and/or an argon concentration of from about 0.1 mol % to about 1.5 mol %.

In one or more embodiments, the second exhaust gas in line 810 can contain less than about 2 mol %, less than about 1 mol %, less than about 0.5 mol %, or less than about 0.1 mol % carbon monoxide. In one or more embodiments, the second exhaust gas in line 710 can contain less than about 2 mol %, less than about 1 mol %, less than about 0.8 mol %, or less than about 0.5 mol % oxygen. In one or more embodiments, the second exhaust gas in line 710 can contain less than about 1 mol %, less than about 0.5 mol %, or less than about 0.1 mol % nitrogen oxides.

The second exhaust gas via line 810 can have a temperature ranging from about 1,100° C. to about 1,500° C. and a pressure ranging from about 1,200 kPa to about 4,500 kPa.

The second exhaust gas via line 810 can be introduced to the expander 815 to produce a second expanded exhaust gas via line 820. The expanded exhaust gas in line 820 can have a temperature ranging from about 690° C. to about 725° C. and a pressure of from about 101 kPa to about 110 kPa. At least a portion of the mechanical power produced from expanding the second exhaust gas in line 810 can be converted into energy, e.g., electricity via the electrical generator 830, used to drive the one or more compressors 105 and/or 150, and/or other work. The expanded gas via line 820 can be vented to the atmosphere, liquefied and used in one or more refrigeration processes, or any combination thereof.

The catalytic reactor 805 can include one or more catalyst-containing beds (one is shown) 807. The catalyst-containing bed 807 can include one or more catalysts disposed therein. Illustrative catalysts can include, but are not limited to, nickel, platinum, rhodium, ruthenium, palladium, derivatives thereof, or any combination thereof. In one or more embodiments, a catalytic reactor 805 having two or more catalyst-containing beds 807 can include the same or different catalysts with respect to one another. The catalyst containing bed 807 can be a fixed bed, a fluidized or moving bed, or a combination thereof.

Figure 9:
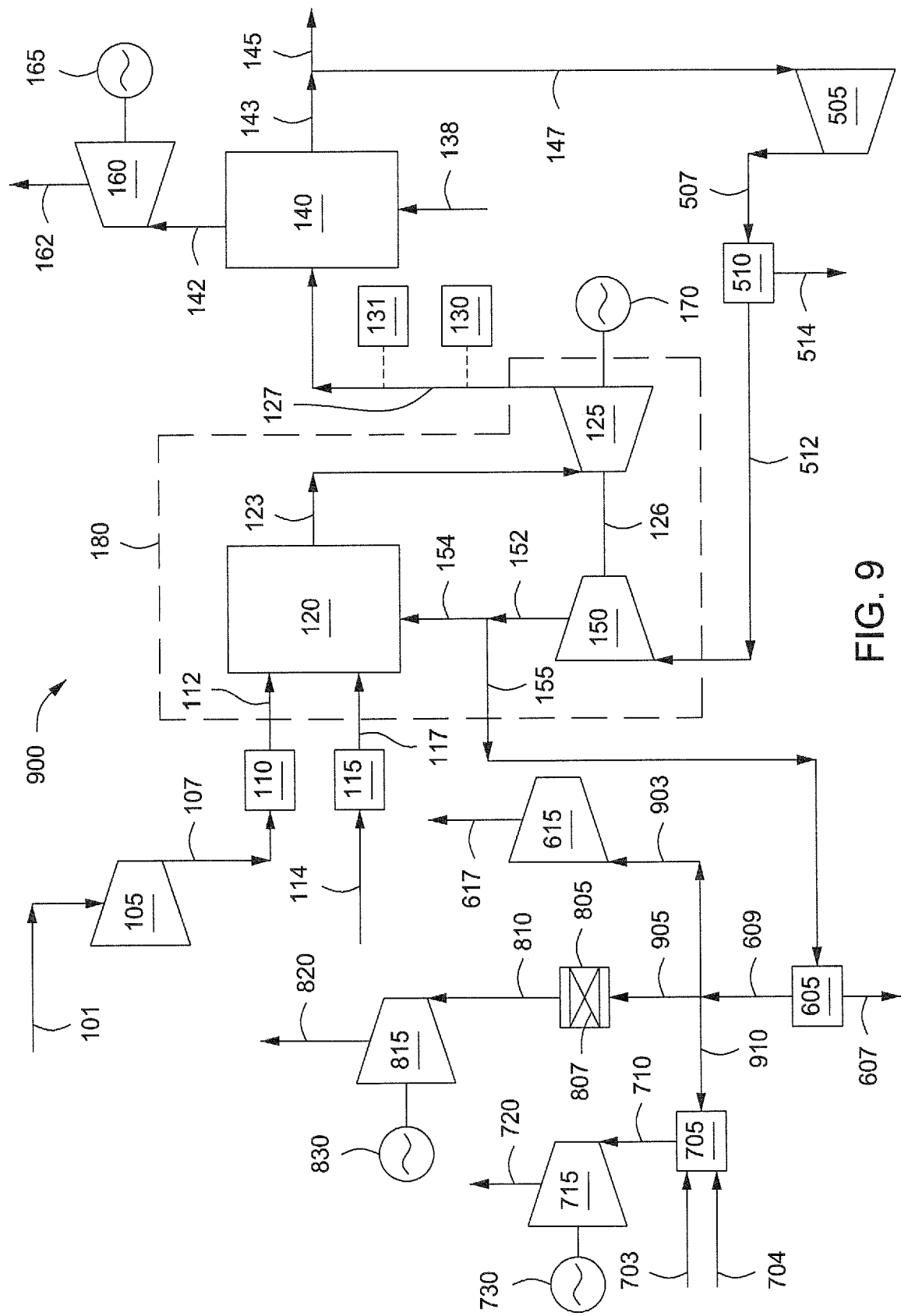
FIG. 9 depicts another schematic of an illustrative combustion and power generation system for generating power, carbon dioxide, and inert gas, according to one or more embodiments described.

FIG. 9 depicts another schematic of an illustrative combustion and power generation system 900 for generating power, carbon dioxide, and inert gas, according to one or more embodiments. The combustion and power generation system 900 can be similar to the systems 100, 300, 400, 500, 600, 700, and/or 800, discussed and described above with reference to FIGS. 1, and 3-8. The combustion and power generation system 900 can produce the second expanded exhaust gas via line 720, the second expanded exhaust gas via line 820, the second compressed exhaust gas via line 617, or any combination thereof. In other words, a first portion of the carbon dioxide lean gas in line 609 can be introduced via line 903 to the compressor 615, a second portion of the carbon dioxide lean gas in line 609 can be introduced via line 905 to the catalytic reactor 805, and/or a third portion of the carbon dioxide lean gas in line 609 can be introduced via line 910 to the combustor 705. In another example, the combustion and power generation system 900 can produce the compressed exhaust gas via line 617 and an expanded exhaust gas via either line 720 or 820. In still another example, the combustion and power generation system 900 can produce an expanded exhaust gas via both lines 720 and 820. In yet another example, the combustion and power generation system 900 can produce an expanded exhaust gas via both lines 720 and 820 and the compressed exhaust gas via line 617.

Various terms have been defined above. To the extent a term used in a claim is not defined above, it should be given the broadest definition persons in the pertinent art have given that term as reflected in at least one printed publication or issued patent.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method for combusting a fuel, comprising:
introducing the fuel, an oxidant, and a diluent to a combustion zone, wherein the oxidant comprises air, oxygen-enriched air containing more than 21 vol % oxygen and up to 50 vol % oxygen, or oxygen-lean air;
combusting at least a portion of the fuel to produce an exhaust gas comprising water, carbon dioxide, oxygen, nitrogen, nitrogen oxides, and carbon monoxide;
expanding the exhaust gas to produce mechanical power and an expanded exhaust gas;
determining a concentration of oxygen and carbon monoxide in the exhaust gas or the expanded exhaust gas or both the exhaust gas and the expanded exhaust gas; and
adjusting an amount of at least one of the oxidant and the fuel introduced to the combustion zone based at least in part on the determined concentrations of the oxygen and carbon monoxide to produce an exhaust gas containing a combined amount of oxygen and carbon monoxide of less than 2 mol % and a nitrogen concentration ranging from 20 mol % to 70 mol %,
wherein the diluent to the combustion zone comprises at least a portion of the exhaust gas that contains the combined amount of oxygen and carbon monoxide of less than 2 mol % and the nitrogen concentration ranging from 20 mol % to 70 mol %.

2. The method of claim 1, wherein the exhaust gas contains a combined amount of oxygen and carbon monoxide of less than 1.5 mol %.

3. The method of claim 1, wherein the exhaust gas contains a combined amount of oxygen and carbon monoxide of less than 1.0 mol %.

4. The method of claim 3, wherein the mol % fuel is equal to $F_{fuel}/(F_{oxidant}+F_{fuel})$, where $F_{fuel}$ is equal to the molar flow rate of fuel and $F_{oxidant}$ is equal to the molar flow rate of oxidant, wherein the mol % oxidant is equal to $F_{oxidant}/(F_{oxidant}+F_{fuel})$, where $F_{oxidant}$ is equal to the molar flow rate of oxidant and $F_{fuel}$ is equal to the molar flow rate of fuel.

5. The method of claim 4, wherein adjusting the amount of the fuel, oxidant, or both introduced to the combustion zone comprises:
decreasing an amount of the oxidant, increasing an amount of the fuel, or both, introduced to the combustion zone if the equivalence ratio ($\phi$) is less than 1 such that the equivalence ratio ($\phi$) increases toward 1; or
decreasing the amount of the fuel, increasing the amount of the oxidant, or both introduced to the combustion zone if the equivalence ratio ($\phi$) is greater than 1 such that the equivalence ratio ($\phi$) decreases toward 1.

6. The method of claim 1, wherein the exhaust gas contains a combined amount of oxygen and carbon monoxide of less than 4000 ppm.

7. The method of claim 1, wherein the adjustment of at least one of the oxidant and the fuel is adapted to drive an equivalence ratio toward 1.0, wherein the equivalence ratio (phi, ϕ) is equal to (mol % fuel/mol % oxidant)$_{actual}$/(mol % fuel/mol % oxidant)$_{stoichiometric}$.

8. The method of claim 1, wherein the oxidant consists essentially of air.

9. The method of claim 1, wherein the exhaust gas has a carbon dioxide concentration ranging from 10 mol % to 34 mol %.

10. The method of claim 1, wherein the fuel comprises methane and one or more C2 to C10 hydrocarbons.

11. The method of claim 10, further comprising reforming at least a portion of the fuel such that a concentration of the one or more C2 to C10 hydrocarbons is reduced to produce a reformed fuel; and introducing the reformed fuel to the combustion zone.

12. The method of claim 11, wherein the reforming comprises contacting the fuel with one or more catalysts.

13. The method of claim 12, wherein the one or more catalysts comprise nickel, platinum, rhodium, ruthenium, palladium, derivatives thereof, mixtures thereof, or any combination thereof.

14. The method of claim 1, further comprising introducing the expanded exhaust gas to a heat recovery unit to produce a first cooled exhaust gas and a heated heat transfer medium.

15. The method of claim 14, wherein the heat transfer medium is at least one of water and steam.

16. The method of claim 15, further comprising introducing the steam to a steam gas turbine coupled to at least one of a generator to produce electrical power or another device to produce mechanical power.

17. The method of claim 15, further comprising introducing the carbon dioxide lean gas to a hydrocarbon reservoir for pressure maintenance.

18. The method of claim 17, further comprising compressing the carbon dioxide lean gas to produce a compressed gas.

19. The method of claim 15, further comprising using the carbon dioxide rich gas in an enhanced oil recovery process.

20. The method of claim 14, further comprising removing at least a portion of the cooled exhaust gas from the system to be introduced to at least one of a vent system, flare system or underground storage or containment system.

21. The method of claim 14, further comprising recycling at least a portion of the cooled exhaust gas to a first compressor to produce a compressed exhaust gas.

22. The method of claim 21, further comprising introducing at least a first portion of the compressed exhaust gas to the combustion zone as the diluent.

23. The method of claim 22, further comprising removing at least a second portion of the compressed exhaust gas from the system to produce an extracted compressed exhaust gas.

24. The method of claim 23, further comprising catalytically converting at least a portion of the carbon monoxide in the second portion of the compressed exhaust gas to carbon dioxide.

25. The method of claim 24, wherein the concentration of carbon monoxide is reduced to less than 500 ppm.

26. The method of claim 24, wherein the remaining concentration of carbon monoxide is less than 500 ppm after catalytically converting it.

27. The method of claim 23, further comprising removing at least a portion of any carbon dioxide from a second portion of the compressed exhaust gas to provide a carbon dioxide-lean gas and a carbon dioxide rich gas.

28. The method of claim 27, further comprising combusting at least a portion of any residual combustible material contained in the carbon dioxide-lean gas to provide a second exhaust gas, and expanding the second exhaust gas to produce mechanical power and an expanded second exhaust gas.

29. The method of claim 27, further catalytically reacting at least a portion of any residual combustible material contained in the carbon dioxide-lean gas to provide a second exhaust gas, and expanding the second exhaust gas to produce mechanical power and an expanded exhaust gas.

30. The method of claim 21, further comprising cooling the cooled exhaust gas and removing at least a portion of the water from the cooled exhaust gas prior to compressing at least a portion of the cooled exhaust gas.

31. The method of claim 14, further comprising introducing the first cooled exhaust gas to a blower to increase a pressure of the first cooled exhaust gas.

32. The method of claim 14, further comprising removing at least a portion of any water in the first cooled exhaust gas to produce a water condensate and a second cooled exhaust gas, and wherein the compressed exhaust gas comprises the second cooled exhaust gas.

33. The method of claim 1, wherein at least a portion of the mechanical power is used to power a compressor, power a generator, or both.

34. The method of claim 1, further comprising compressing the oxidant prior to being introduced to the combustion zone.

35. The method of claim 1, further comprising controlling the oxidant flow rate by use of at least one of a compressor, valve, and nozzle.

36. The method of claim 1, further comprising controlling the fuel flow rate by the use of at least one of a valve, pump, nozzle, turbine meter, venturi flow meter, and orifice plate.

37. The method of claim 1, wherein the concentrations of the at least two gases selected from the group consisting of oxygen and carbon monoxide, in the exhaust gas or the expanded exhaust gas or both the exhaust gas and the expanded exhaust gas are determined by using at least one of lambda, zirconia oxygen, titania, galvanic, infrared, and oxide film sensors.

38. The method of claim 1, wherein the oxidant is oxygen-enriched air, and the exhaust gas further comprises a carbon dioxide concentration of 10 mol % to 34 mol %, a water concentration of 15 mol % to 60 mol %, a fuel concentration of 0.001 mol % to 0.1 mol %, a nitrogen oxide concentration of 0.01 mol % to 0.03 mol %, and an argon concentration of 0.2 mol % to 0.9 mol %.

39. A method for combusting a fuel, comprising:
introducing the fuel, an oxidant, and a diluent to a combustion zone, wherein the oxidant comprises air, oxygen-enriched air containing more than 21 vol % oxygen and up to 50 vol % oxygen, or oxygen-lean air;
combusting at least a portion of the fuel to produce an exhaust gas comprising water, carbon dioxide, oxygen, nitrogen, nitrogen oxides, and carbon monoxide;
expanding the exhaust gas to produce mechanical power and an expanded exhaust gas;
determining a concentration of oxygen and carbon monoxide in the expanded exhaust gas;
adjusting an amount of at least one of the oxidant and the fuel introduced to the combustion zone based at least in part on the determined concentrations of the oxygen and carbon monoxide in the expanded exhaust gas to produce an exhaust gas containing a combined amount of oxygen and carbon monoxide of less than 2 mol % and a nitrogen concentration ranging from 20 mol % to 70 mol %, and recycling at least a portion of the exhaust gas that contains the combined amount of oxygen and carbon monoxide of less than 2 mol % and the nitrogen concentration ranging from 20 mol % to 70 mol % to the combustion zone as the diluent.

40. The method of claim 39, wherein the exhaust gas contains a combined amount of oxygen and carbon monoxide of less than 1.5 mol %.

41. The method of claim 39, wherein the exhaust gas contains a combined amount of oxygen and carbon monoxide of less than 1.0 mol %.

42. The method of claim 39, wherein the exhaust gas contains a combined amount of oxygen and carbon monoxide of less than 4000 ppm.

43. The method of claim 39, wherein the adjustment of at least one of the oxidant and the fuel is adapted to drive an equivalence ratio toward 1.0, wherein the equivalence ratio (phi, $\phi$) is equal to (mol % fuel/mol % oxidant)$_{actual}$/(mol % fuel/mol % oxidant)$_{stoichiometric}$.

* * * * *